(12) United States Patent
Takahashi et al.

(10) Patent No.: US 9,702,434 B2
(45) Date of Patent: Jul. 11, 2017

(54) FRICTION TRANSMISSION BELT

(71) Applicant: BANDO CHEMICAL INDUSTRIES, LTD., Kobe (JP)

(72) Inventors: Shinji Takahashi, Kobe (JP); Takayuki Okubo, Kobe (JP); Yasuhiro Takano, Kobe (JP); Hiroyuki Tachibana, Kobe (JP); Tadahiko Noguchi, Kobe (JP)

(73) Assignee: BANDO CHEMICAL INDUSTRIES, LTD., Kobe-shi (JP)

( * ) Notice: Subject to any disclaimer, the term of this patent is extended or adjusted under 35 U.S.C. 154(b) by 295 days.

(21) Appl. No.: 14/465,617

(22) Filed: Aug. 21, 2014

(65) Prior Publication Data

US 2014/0364260 A1 Dec. 11, 2014

Related U.S. Application Data

(63) Continuation of application No. PCT/JP2012/008338, filed on Dec. 26, 2012.

(30) Foreign Application Priority Data

Feb. 24, 2012 (JP) .................. 2012-039235

(51) Int. Cl.
*F16G 1/00* (2006.01)
*F16G 5/00* (2006.01)
*F16G 9/00* (2006.01)
*F16G 5/08* (2006.01)
*C08J 5/04* (2006.01)
*F16G 5/20* (2006.01)
(Continued)

(52) U.S. Cl.
CPC ............. *F16G 5/08* (2013.01); *B29D 29/106* (2013.01); *C08J 5/04* (2013.01); *C08K 7/02* (2013.01); *C08L 23/16* (2013.01); *F02B 67/06* (2013.01); *F16G 1/10* (2013.01); *F16G 5/20* (2013.01); *C08L 2205/16* (2013.01)

(58) Field of Classification Search
CPC ........ F16G 5/20; C08L 21/00; C08L 2666/02; C08L 77/00; C08L 51/08
USPC .......................................... 474/263
See application file for complete search history.

(56) References Cited

U.S. PATENT DOCUMENTS 5,501,908 A * 3/1996 Shioyama ............... C08L 11/00
  428/295.1
5,711,734 A * 1/1998 Shioyama ............ C08K 5/3415
  474/260
(Continued)

FOREIGN PATENT DOCUMENTS

EP 0622563 A1 11/1994
JP H07-63241 A 3/1995
(Continued)

OTHER PUBLICATIONS

Handbook of Fiber Science and Technology, vol. III, Jan. 1, 1993, p. 131, paragraph 4.12, figure 2.28, XP 002746382.

*Primary Examiner* — Henry Liu
(74) *Attorney, Agent, or Firm* — Knobbe Martens Olson & Bear LLP

(57) ABSTRACT

A friction transmission belt includes short fibers arranged so as to protrude from a surface of a pulley contact-side part made of a rubber composition. The short fibers consist of aramid short fibers and non-aramid synthetic short fibers having a standard moisture regain of equal to or less than 4%.

18 Claims, 15 Drawing Sheets

(51) Int. Cl.
　　　*B29D 29/10*　　(2006.01)
　　　*F16G 1/10*　　(2006.01)
　　　*C08K 7/02*　　(2006.01)
　　　*C08L 23/16*　　(2006.01)
　　　*F02B 67/06*　　(2006.01)

(56) References Cited

U.S. PATENT DOCUMENTS

| | | | | |
|---|---|---|---|---|
| 7,988,577 B2* | 8/2011 | Omori | | F16G 5/20 474/238 |
| 8,979,692 B2* | 3/2015 | Matsuda | | F16G 5/20 474/237 |
| 2003/0139242 A1* | 7/2003 | Teves | | F16G 1/06 474/263 |
| 2004/0058767 A1* | 3/2004 | Hara | | B29D 29/08 474/263 |
| 2004/0214676 A1* | 10/2004 | Shiriike | | F16G 5/20 474/260 |
| 2005/0037882 A1* | 2/2005 | Hineno | | C08L 21/00 474/263 |
| 2006/0105873 A1* | 5/2006 | Sato | | F16G 5/06 474/263 |
| 2006/0154770 A1* | 7/2006 | Takaba | | F16G 5/20 474/263 |
| 2007/0082777 A1* | 4/2007 | Nishida | | F16G 5/06 474/237 |
| 2009/0048048 A1* | 2/2009 | Nakamura | | B29D 29/103 474/263 |
| 2009/0149289 A1* | 6/2009 | Cheong | | F16G 5/20 474/263 |
| 2009/0264236 A1* | 10/2009 | Omori | | F16G 5/20 474/238 |
| 2010/0292406 A1* | 11/2010 | Herzog | | B60C 1/0016 525/208 |
| 2010/0331129 A1* | 12/2010 | Mukai | | F16G 5/20 474/237 |
| 2011/0086949 A1* | 4/2011 | Mentink | | B82Y 30/00 524/48 |
| 2011/0124453 A1* | 5/2011 | Nakashima | | F16G 1/10 474/139 |
| 2011/0152411 A1* | 6/2011 | Omeis | | C08K 5/005 524/97 |
| 2011/0196071 A1* | 8/2011 | Mentink | | A23G 4/08 524/51 |
| 2011/0218069 A1* | 9/2011 | Nakashima | | F16G 1/08 474/260 |
| 2011/0262690 A1* | 10/2011 | Bayer | | C04B 35/6263 428/116 |
| 2011/0265927 A1* | 11/2011 | Weng | | C08K 9/04 152/450 |
| 2011/0300981 A1* | 12/2011 | Takahashi | | C08K 3/346 474/264 |

FOREIGN PATENT DOCUMENTS

| | | |
|---|---|---|
| JP | 2003-172414 A | 6/2003 |
| JP | 2004-125164 A | 4/2004 |
| JP | 2011-21728 A | 2/2011 |
| JP | 2011-252510 A | 12/2011 |

* cited by examiner

FRICTION TRANSMISSION BELT

CROSS-REFERENCE TO RELATED APPLICATIONS

This is a continuation of International Application No. PCT/JP2012/008338 filed on Dec. 26, 2012, which claims priority to Japanese Patent Application No. 2012-039235 filed on Feb. 24, 2012. The entire disclosures of these applications are incorporated by reference herein.

BACKGROUND

The present disclosure relates to a friction transmission belt.

Noise issues in automobiles include, e.g., the issue where a V-ribbed belt for driving an accessory(ies) slips on a pulley due to water entering an engine room during traveling in the rain and entering between the V-ribbed belt and the pulley, thereby generating slip noise. Japanese Unexamined Patent Publication No. 2011-252510 discloses, in order to reduce such slip noise, a friction transmission belt in which a mixture of ethylene-α-olefin elastomer with 10 to 50 parts by mass of silica having 100 to 300 m$^2$/g of a nitrogen adsorption specific surface area (measured by BET), 5 to 50 parts by mass of one of polyamide short fibers or para-aramid short fibers, and equal to or less than 30 parts by mass of cotton short fibers is used as a rubber composition forming a compression rubber layer of a V-ribbed belt.

Moreover, Japanese Unexamined Patent Publication No. 2004-125164 discloses, in order to improve durability, that a rubber composition forming a compression rubber layer of a V-belt for scooter transmission contains aramid short fibers and polyester short fibers.

SUMMARY

The present disclosure is a friction transmission belt including short fibers arranged so as to protrude from a surface of a pulley contact-side part made of a rubber composition. The short fibers consist of aramid short fibers and non-aramid synthetic short fibers having a standard moisture regain of equal to or less than 4%.

DETAILED DESCRIPTION

Embodiments will be described below in detail with reference to drawings.

First Embodiment

Figure 1:
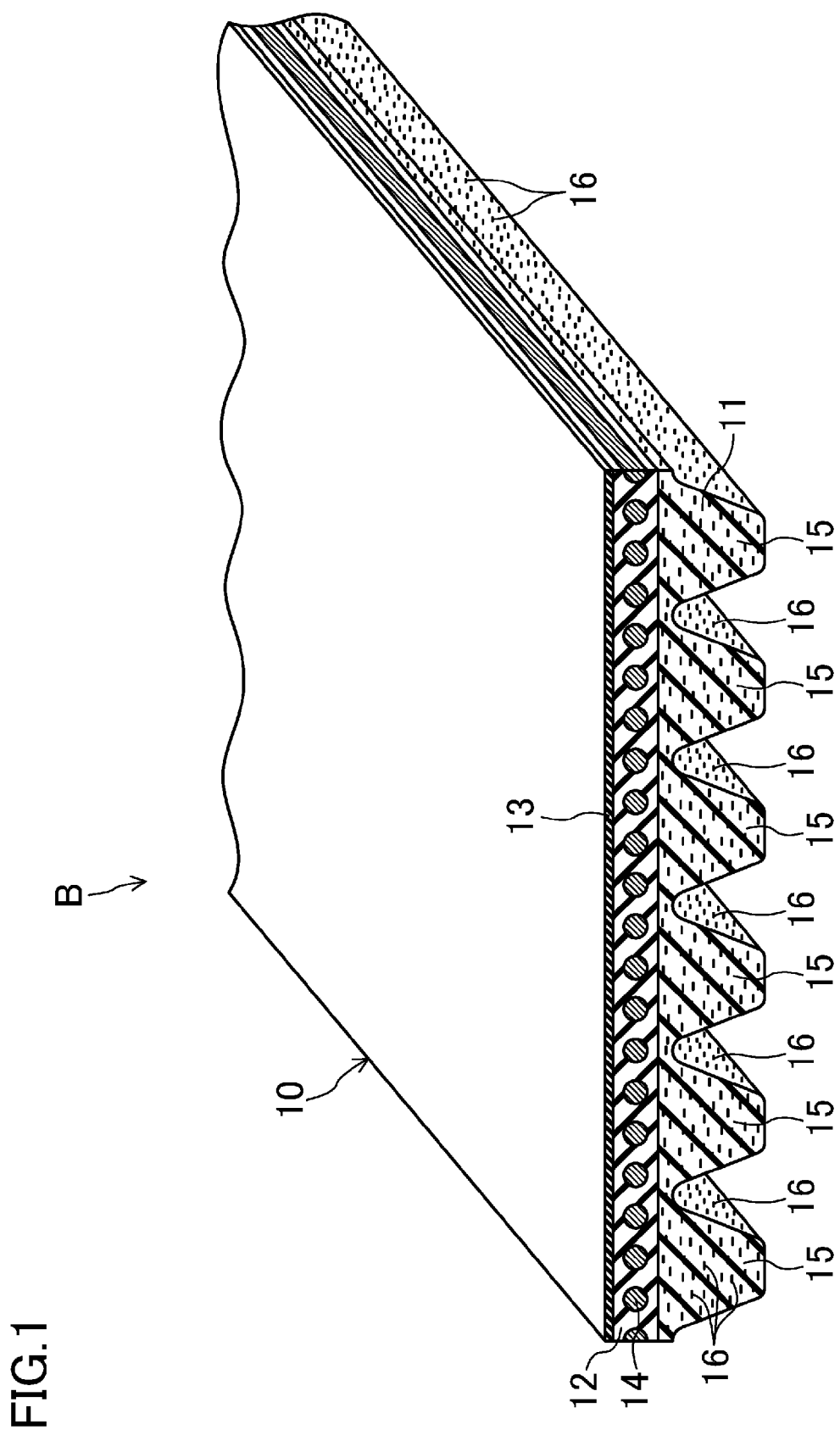
FIG. 1 is a perspective view illustrating a piece cut out of a V-ribbed belt of a first embodiment.
Figure 2:
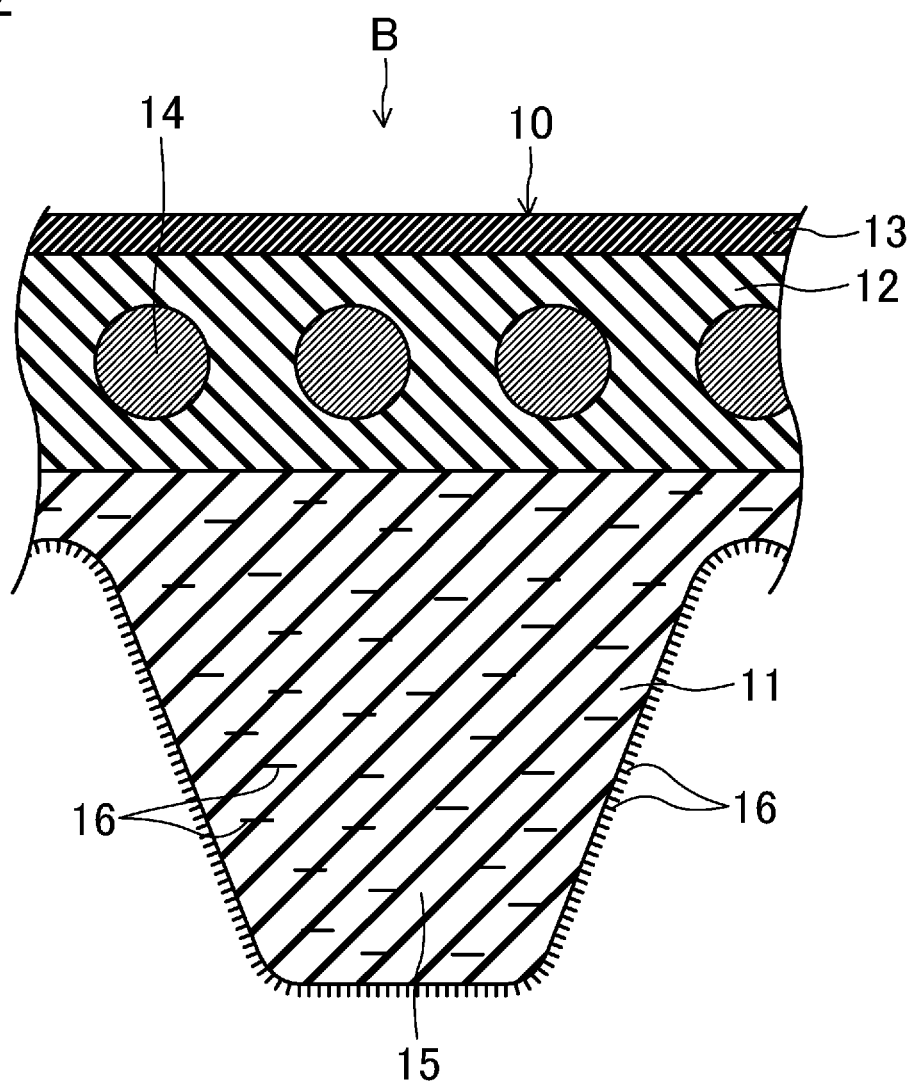
FIG. 2 is a partial cross-sectional view of the V-ribbed belt of the first embodiment.

FIGS. 1 and 2 illustrate a V-ribbed belt (friction transmission belt) B of a first embodiment. The V-ribbed belt B of the first embodiment is used for, e.g., a belt transmission system for driving an accessory(ies) in an engine room of an automobile. The V-ribbed belt B of the first embodiment has, e.g., a circumferential length of 700 to 3000 mm, a width of 10 to 36 mm, and a thickness of 4.0 to 5.0 mm.

The V-ribbed belt B of the first embodiment includes a V-ribbed belt body 10 having a trilaminar structure of a compression rubber layer 11 forming a pulley contact-side part on an inner circumferential side of the V-ribbed belt B, an intermediate adhesion rubber layer 12, and a back rubber layer 13 formed on an outer circumferential side of the V-ribbed belt B. A cord 14 is embedded in the adhesion rubber layer 12 so as to form a helical pattern with pitch in a belt width direction.

The compression rubber layer 11 forms the pulley contact-side part, and a plurality of V-ribs 15 are formed so as to extend inward of the V-ribbed belt B in the compression rubber layer 11. The V-ribs 15 are each formed as a protrusion extending in a belt length direction and having a substantially inverted triangular cross section, and are arranged in the belt width direction. Each V-rib 15 is formed such that a height is, e.g., 2.0 to 3.0 mm and that a width between base ends is, e.g., 1.0 to 3.6 mm. The number of V-ribs 15 is, e.g., three to six (FIG. 1 illustrates six V-ribs 15). The compression rubber layer 11 is made of a rubber composition formed in such a manner that a rubber component and various compounding ingredients are mixed and kneaded to form a non-crosslinked rubber composition and that the non-crosslinked rubber composition is heated and pressurized and is cross-linked using a cross-linker.

Examples of the rubber component of the rubber composition forming the compression rubber layer 11 include ethylene-α-olefin elastomer (EPDM, EPR, etc.), chloroprene rubber (CR), chlorosulfonated polyethylene rubber (CSM), and hydrogenated acrylonitrile rubber (H-NBR). Of these materials, ethylene-α-olefin elastomer is preferable. Of ethylene-α-olefin elastomer, EPDM is preferable. The rubber component may be formed of a single type of material, or may be formed of a mixture of plural types of material.

Examples of the compounding ingredients include a reinforcer, a filler, an antioxidant, a softener, a cross-linker, a vulcanization accelerator, and a vulcanization assistant.

Examples of the reinforcer include carbon black and silica. Examples of carbon black include channel black, furnace black such as SAF, ISAF, N-339, HAF, N-351, MAF, FEF, SRF, GPF, ECF, and N-234, thermal black such as FT and MT, and acetylene black. The reinforcer may be formed of a single type of material, or may be formed of a mixture of plural types of material. Considering a favorable balance between abrasion resistance and flex resistance, the mixing amount of the reinforcer with respect to 100 parts by mass of the rubber component is preferably 30 to 80 parts by mass, more preferably 40 to 70 parts by mass, and much more preferably 50 to 70 parts by mass.

Examples of the filler include inorganic fillers such as calcium carbonate and sheet silicate containing bentonite. Considering enhancement of reduction in slip noise generated due to the presence of water, sheet silicate having excellent water absorbability is preferable. Examples of sheet silicate include smectite-group sheet silicate, vermiculite-group sheet silicate, and kaolin-group sheet silicate. Examples of smectite-group sheet silicate include montmorillonite, beidellite, saponite, and hectorite. Examples of vermiculite-group sheet silicate include trioctahedral vermiculite and dioctahedral vermiculite. Examples of kaolin-group sheet silicate include kaolinite, dickite, halloysite, lizardite, amesite, and chrysotile. Of these materials, montmorillonite of the smectite group is preferable. The filler may be formed of a single type of material, or may be formed of a mixture of plural types of material. The mixing amount of the filler with respect to 100 parts by mass of the rubber component is preferably 10 to 70 parts by mass, more preferably 20 to 60 parts by mass, and much more preferably 25 to 35 parts by mass. The total mixing amount of the reinforcer and the filler with respect to 100 parts by mass of the rubber component is preferably 40 to 150 parts by mass, more preferably 55 to 115 parts by mass, and much more preferably 70 to 80 parts by mass.

Examples of the antioxidant include amine-based antioxidants, quinoline-based antioxidants, hydroquinone derivatives, phenol-based antioxidants, and phosphite ester-based antioxidants. The antioxidant may be formed of a single type of material, or may be formed of a mixture of plural types of material. The mixing amount of the antioxidant with respect to 100 parts by mass of the rubber component is, e.g., 0 to 8 parts by mass.

Examples of the softener include mineral oil-based softeners such as paraffin wax, vegetable oil-based softeners such as castor oil, cottonseed oil, flaxseed oil, rapeseed oil, soybean oil, palm oil, coconut oil, peanut oil, Japan wax, rosin, and pine oil, and petroleum-based softeners. The softener may be formed of a single type of material, or may be formed of a mixture of plural types of material. The mixing amount of the softener with respect to 100 parts by mass of the rubber component is, e.g., 2 to 30 parts by mass.

Examples of the cross-linker include sulfur and organic peroxide. The cross-linker may be formed of one of sulfur or organic peroxide, or may be formed of both of sulfur and organic peroxide. In the case of sulfur, the mixing amount of the cross-linker with respect to 100 parts by mass of the rubber component is, e.g., 0.5 to 4.0 parts by mass. In the case of organic peroxide, the mixing amount of the cross-linker with respect to 100 parts by mass of the rubber component is, e.g., 0.5 to 8 parts by mass.

Examples of the vulcanization accelerator include thiuram-based (e.g., TFT) vulcanization accelerators, dithiocarbamate-based (e.g., EZ) vulcanization accelerators, and sulfonamide-based (e.g., MSA) vulcanization accelerators. The vulcanization accelerator may be formed of a single type of material, or may be formed of a mixture of plural types of material. The mixing amount of the vulcanization accelerator with respect to 100 parts by mass of the rubber component is, e.g., 2 to 10 parts by mass.

Examples of the vulcanization assistant include metal oxide such as magnesium oxide and zinc oxide (zinc flower), metal carbonate, fatty acid such as stearic acid, and derivatives thereof. The vulcanization assistance may be formed of a single type of material, or may be formed of a mixture of plural types of material. The mixing amount of the vulcanization assistance with respect to 100 parts by mass of the rubber component is, e.g., 0.5 to 8 parts by mass.

The rubber composition forming the compression rubber layer 11 contains short fibers 16. The short fibers 16 consist of aramid short fibers and non-aramid synthetic short fibers having a standard moisture regain of equal to or less than 4%. The short fibers 16 are preferably arranged so as to be oriented in the belt width direction. The adhesion treatment for dipping the short fibers 16 in, e.g., a resorcin formalin latex aqueous solution (hereinafter referred to as an "RFL aqueous solution") and then heating the short fibers 16 may be or may not be applied to the short fibers 16. In the former case, the adhesion treatment may be applied to both of the aramid short fibers and the non-aramid synthetic short fibers, or may be applied to one of the aramid short fibers or the non-aramid synthetic short fibers. The total mixing amount of the short fibers 16 with respect to 100 parts by mass of the rubber component is preferably 10 to 85 parts by mass, more preferably 15 to 40 parts by mass, and much more preferably 20 to 30 parts by mass.

Examples of the aramid short fibers include para-aramid short fibers and meta-aramid short fibers. The aramid short fibers may include only the para-aramid short fibers, only the meta-aramid short fibers, or both. The standard moisture regain of the para-aramid short fiber is 3%, and the standard moisture regain of the meta-aramid short fiber is 5.25%.

The length of the aramid short fiber is preferably 0.1 to 10 mm, and more preferably 0.5 to 5 mm. The diameter of the aramid short fiber is, e.g., 10 to 50 μm. The mixing amount of the aramid short fibers with respect to 100 parts by mass of the rubber component is preferably 2 to 25 parts by mass, more preferably 3 to 10 parts by mass, and much more preferably 3 to 7 parts by mass. In the case where the aramid short fibers include both of the para-aramid short fibers and the meta-aramid short fibers, the mixing mass ratio of the para-aramid short fibers to the meta-aramid short fibers, i.e., Mass of Para-Aramid Short Fibers/Mass of Meta-Aramid Short Fibers, is preferably 1/9 to 10/0, and more preferably 5/5 to 7/3.

The non-aramid synthetic short fibers have a standard moisture regain of equal to or less than 4%. The non-aramid synthetic short fibers preferably have a standard moisture regain of equal to or less than 2%, and more preferably a standard moisture regain of equal to or less than 1%. The standard moisture regain of fibers is the percentage of moisture contained in fibers under the environment where a temperature is 20° C. and a humidity is 65%, and standard moisture regains for various types of fibers are listed in, e.g., JIS L0105. Examples of the non-aramid synthetic short fibers having a standard moisture regain of equal to or less than 4% include polyester short fibers (having a standard moisture regain of 0.4%), acrylic short fibers (having a standard moisture regain of 2.0%), polyurethane short fibers (having a standard moisture regain of 1.0%), and polyethylene short fibers (having a standard moisture regain of 0.0%). Of these fibers, polyester short fibers are preferable. The non-aramid synthetic short fibers may be formed of a single type of material, or may be formed of a mixture of plural types of material.

The length of the non-aramid synthetic short fiber is preferably 0.5 to 10 mm, and more preferably 1 to 3 mm. The diameter of the non-aramid synthetic short fiber is, e.g., 10 to 50 µm. The mixing amount of the non-aramid synthetic short fibers with respect to 100 parts by mass of the rubber component is preferably 5 to 60 parts by mass, more preferably 10 to 30 parts by mass, and much more preferably 15 to 25 parts by mass.

The length of the aramid short fiber may be longer than that of the non-aramid synthetic short fiber, may be shorter than that of the non-aramid synthetic short fiber, or may be equal to that of the non-aramid synthetic short fiber. The length ratio of the aramid short fiber to the non-aramid synthetic short fiber, i.e., Length of Aramid Short Fiber/Length of Non-Aramid Synthetic Short Fiber, is preferably 0.1 to 10, and more preferably 0.3 to 3.

The diameter of the aramid short fiber may be larger than that of the non-aramid synthetic short fiber, may be smaller than that of the non-aramid synthetic short fiber, or may be equal to that of the non-aramid synthetic short fiber. The diameter ratio of the aramid short fiber to the non-aramid synthetic short fiber, i.e., Diameter of Aramid Short Fiber/Diameter of Non-Aramid Synthetic Short Fiber, is preferably 0.01 to 100, and more preferably 0.05 to 10.

The mixing amount of the aramid short fibers with respect to 100 parts by mass of the rubber component may be greater than that of the non-aramid synthetic short fibers, may be less than that of the non-aramid synthetic short fibers, or may be equal to that of the non-aramid synthetic short fibers. Considering favorable processability of the rubber composition by kneading, the mixing amount of the aramid short fibers is preferably less than that of the non-aramid synthetic short fibers. The mixing mass ratio of the aramid short fibers to the non-aramid synthetic short fibers, i.e., Mass of Aramid Short Fibers/Mass of Non-Aramid Synthetic Short Fibers, is preferably 0.01 to 100, more preferably 0.05 to 2, much more preferably 0.1 to 0.5, and particularly preferably 0.2 to 0.3.

The short fibers 16 are arranged so as to protrude from surfaces of the V-ribs 15 of the compression rubber layer 11 forming the pulley contact-side part. The length of the protruding part of the short fiber 16 is preferably 0.01 to 5 mm, and more preferably 0.05 to 2 mm. The length of the protruding part of the short fiber 16 can be measured by observation using an electronic microscope such as a SEM. In the case of the V-belt for transmission as disclosed in Japanese Unexamined Patent Publication No. 2004-125164, since pulley contact-side surfaces define a V-cut surface, no short fibers protrude from the pulley contact-side surfaces.

The length of the protruding parts of the aramid short fiber is preferably longer than that of the protruding parts of the non-aramid synthetic short fiber. Specifically in this case, the length of the protruding part of the aramid short fiber is preferably 0.05 to 5 mm, and more preferably 0.1 to 2 mm. The length of the protruding part of the non-aramid synthetic short fiber is preferably 0.01 to 2 mm, and more preferably 0.05 to 1 mm. The length ratio of the protruding part of the aramid short fiber to the protruding part of the non-aramid synthetic short fiber, i.e., Length of Protruding Part of Aramid Short Fiber/Length of Protruding Part of Non-Aramid Synthetic Short Fiber, is preferably 1 to 10, and more preferably 3 to 6. The configuration in which short fibers 16 protrude from surfaces of V-ribs 15 can be realized in such a manner that a rubber composition mixed with aramid short fibers and non-aramid synthetic short fibers is ground. In this case, the length of the protruding part of the aramid short fiber having relatively-high strength is longer than that of the protruding part of the non-aramid synthetic short fiber having relatively-low strength. Thus, the foregoing configuration can be, as will be described later, easily realized in such a manner that the rubber composition mixed with the aramid short fibers and the non-aramid synthetic short fibers is ground to form the V-ribs 15. Moreover, the foregoing configuration can be realized in such a manner that aramid short fibers are formed so as to have a length longer than that of non-aramid synthetic short fibers.

The total area occupancy of the short fibers 16 at the surfaces of the V-ribs 15 of the compression rubber layer 11 forming the pulley contact-side part is preferably 40 to 99%, more preferably 60 to 95%, and much more preferably 80 to 95%. The area occupancy of the aramid short fibers is preferably 30 to 80%, more preferably 30 to 70%, and much more preferably 35 to 50%. The area occupancy of the non-aramid synthetic short fibers is preferably 15 to 65%, more preferably 20 to 50%, and much more preferably 40 to 50%. The area occupancy ratio of the aramid short fibers to the non-aramid synthetic short fibers, i.e., Area Occupancy of Aramid Short Fibers/Area Occupancy of Non-Aramid Synthetic Short Fibers, is preferably 0.1 to 10, more preferably 0.5 to 2, and much more preferably 0.8 to 1.5. The area occupancy of the short fibers 16 can be obtained in such a manner that an image of the surfaces of the V-ribs 15 observed through a microscope is analyzed using image analysis software (e.g., "WinROOF" manufactured by Mitani Corporation). Note that the area occupancy of the short fibers 16 can be adjusted depending on the mixing amount of the short fibers 16.

According to the V-ribbed belt B of the first embodiment, since the short fibers 16 protruding from the surfaces of the V-ribs 15 of the compression rubber layer 11 forming the pulley contact-side part consist, as described above, of the aramid short fibers and the non-aramid synthetic short fibers having a standard moisture regain of equal to or less than 4%, slip noise generated due to the presence of water can be reduced. Such features and advantages cannot be realized in the case where, e.g., nylon short fibers having a standard moisture regain of more than 4% are, as short fibers, used in addition to aramid short fibers.

The rubber composition forming the compression rubber layer 11 may additionally contain, e.g., a surfactant.

The adhesion rubber layer 12 is formed in a strip shape so as to have a horizontally-oriented rectangular cross section, and has, e.g., a thickness of 1.0 to 2.5 mm. The back rubber layer 13 is also formed in a strip shape so as to have a horizontally-oriented rectangular cross section, and has, e.g., a thickness of 0.4 to 0.8 mm. Considering reduction in noise generated between the V-ribbed belt B and a flat pulley contacting a back surface of the V-ribbed belt B, the back rubber layer 13 is preferably formed such that a weave pattern of a woven fabric is transferred to a surface of the back rubber layer 13. The adhesion rubber layer 12 and the back rubber layer 13 are made of a rubber composition formed in such a manner that a rubber component and various compounding ingredients are mixed and kneaded to form a non-crosslinked rubber composition and that the non-crosslinked rubber composition is heated and pressurized and is cross-linked using the cross-linker. Considering reduction in adhesiveness caused due to contact between the V-ribbed belt B and the flat pulley contacting the back surface of the V-ribbed belt B, the back rubber layer 13 is preferably made of a rubber composition harder than the adhesion rubber layer 12. The configuration may be employed, in which the compression rubber layer 11 and the adhesion rubber layer 12 form the V-ribbed belt body 10, and a reinforcement fabric such as a woven fabric, a knitted fabric, or a non-woven fabric formed of, e.g., yarns of cotton, polyamide fibers, polyester fibers, or aramid fibers is provided instead of the back rubber layer 13.

Examples of the rubber component of the rubber composition forming the adhesion rubber layer 12 and the back rubber layer 13 include ethylene-α-olefin elastomer (EPDM, EPR, etc.), chloroprene rubber (CR), chlorosulfonated polyethylene rubber (CSM), and hydrogenated acrylonitrile rubber (H-NBR). The rubber component of the adhesion rubber layer 12 and the back rubber layer 13 is preferably the same as that of the compression rubber layer 11. As in the compression rubber layer 11, examples of the compounding ingredients include a reinforcer, a filler, an antioxidant, a softener, a cross-linker, a vulcanization accelerator, and a vulcanization assistant. The rubber composition forming the adhesion rubber layer 12 and the back rubber layer 13 may be or may not be mixed with short fibers.

The compression rubber layer 11, the adhesion rubber layer 12, and the back rubber layer 13 may be made of different rubber compositions, or may be made of the same rubber composition.

The cord 14 is formed of twisted yarns of, e.g., polyester (PET) fibers, polyethylene naphthalate (PEN) fibers, aramid fibers, or vinylon fibers. For adhesiveness of the cord 14 to the V-ribbed belt body 10, the adhesion treatment for dipping the cord 14 in an RFL aqueous solution and then heating the cord 14 and/or the adhesion treatment for dipping the cord 14 in rubber cement and then drying the cord 14 are applied to the cord 14 prior to molding.

Figure 3:
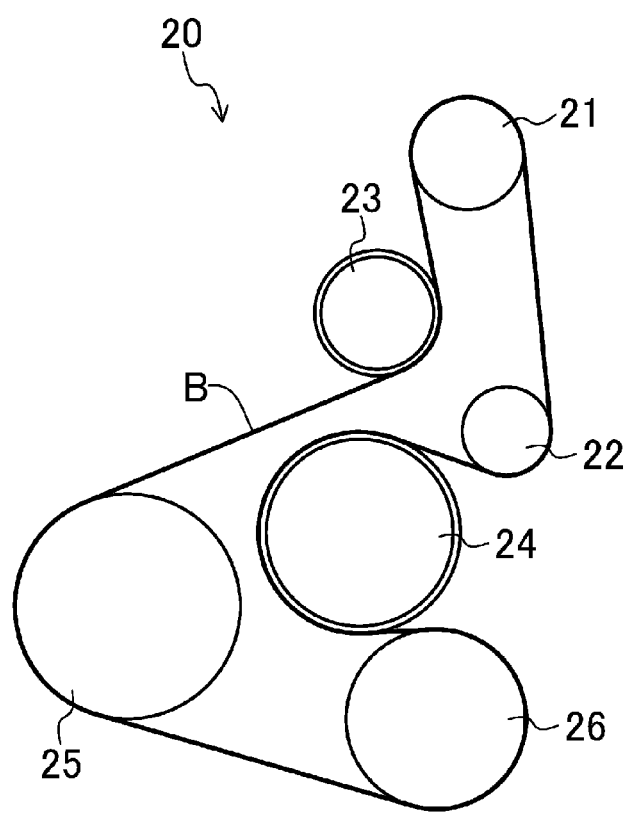
FIG. 3 is a view illustrating the layout of pulleys in an accessory drive belt transmission system.

FIG. 3 illustrates the layout of pulleys in an accessory drive belt transmission system 20 for automobile using the V-ribbed belt B of the first embodiment. The accessory drive belt transmission system 20 is a serpentine drive type system in which the V-ribbed belt B is wrapped around six pulleys, i.e., four ribbed pulleys and two flat pulleys, to transmit power.

The accessory drive belt transmission system 20 includes a power steering pulley 21 positioned on the uppermost side, an AC generator pulley 22 disposed on a substantially lower right side of the power steering pulley 21, a tensioner pulley 23 which is a flat pulley disposed on a lower left side of the power steering pulley 21 and an upper left side of the AC generator pulley 22, a water pump pulley 24 which is a flat pulley disposed right below the tensioner pulley 23 on a lower left side of the AC generator pulley 22, a crank shaft pulley 25 disposed on a lower left side of the tensioner pulley 23 and a lower left side of the water pump pulley 24, and an air-conditioner pulley 26 disposed on a lower right side of the water pump pulley 24 and a lower right side of the crank shaft pulley 25. Of these pulleys, the pulleys other than the tensioner pulley 23 and the water pump pulley 24 which are the flat pulleys are ribbed pulleys. These ribbed pulleys and flat pulleys are formed of, e.g., a pressed metal product, a casted product, or a resin molded product made of nylon resin, phenol resin, etc., and each have a diameter of φ50 to 150 mm.

In the accessory drive belt transmission system 20, the V-ribbed belt B is wrapped around the power steering pulley 21 such that a V-rib-side surface of the V-ribbed belt B contacts the power steering pulley 21. Then, after the V-ribbed belt B is wrapped around the tensioner pulley 23 such that the back surface of the V-ribbed belt B contacts the tensioner pulley 23, the V-ribbed belt B is wrapped around the crank shaft pulley 25 and the air-conditioner pulley 26 in this order such that the V-rib-side surface of the V-ribbed belt B contacts the crank shaft pulley 25 and the air-conditioner pulley 26. Subsequently, the V-ribbed belt B is wrapped around the water pump pulley 24 such that the back surface of the V-ribbed belt B contacts the water pump pulley 24. Then, the V-ribbed belt B is wrapped around the AC generator pulley 22 such that the V-rib-side surface of the V-ribbed belt B contacts the AC generator pulley 22, followed by returning to the power steering pulley 21.

In the accessory drive belt transmission system 20, the V-ribbed belt B of the first embodiment is used, and the short fibers 16 protruding from the surfaces of the V-ribs 15 of the compression rubber layer 11 forming the pulley contact-side part of the V-ribbed belt B of the first embodiment consist of the aramid short fibers and the non-aramid synthetic short fibers having a standard moisture regain of equal to or less than 4%. Thus, slip noise generated due to the presence of water can be reduced.

Next, one example of the method for manufacturing the V-ribbed belt B of the first embodiment will be described with reference to FIGS. 4-8.

In manufacturing of the V-ribbed belt B of the first embodiment, a rubber component is first mixed with compounding ingredients containing short fibers 16, and the resultant is kneaded using a kneading machine such as a kneader or a Banbury mixer. The resultant non-crosslinked rubber composition is formed into a sheet by, e.g., calendering, thereby forming a non-crosslinked rubber sheet 11' for compression rubber layer 11 (i.e., a non-crosslinked rubber composition for belt formation). In the non-crosslinked rubber sheet 11' for compression rubber layer 11, the short fibers 16 are oriented in a length direction of the non-crosslinked rubber sheet 11'. Similarly, a non-crosslinked rubber sheet 12' for adhesion rubber layer 12 and a non-crosslinked rubber sheet 13' for back rubber layer 13 are formed. After the adhesion treatment for dipping twisted yarns 14' to be a cord 14 in an RFL aqueous solution and then heating the twisted yarns 14', the adhesion treatment for dipping the twisted yarns 14' in rubber cement and then heating and drying the twisted yarns 14' is performed if necessary.

Figure 4:
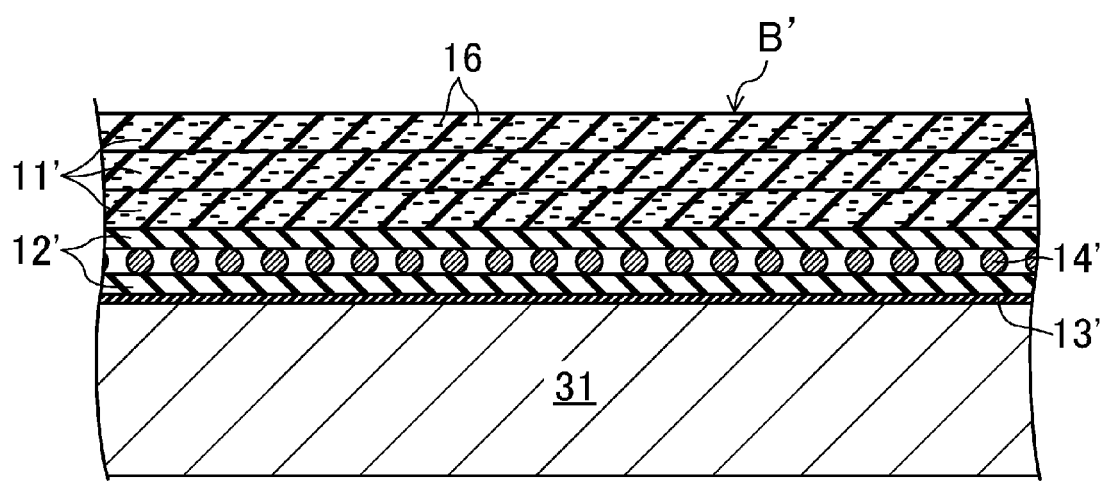
FIG. 4 is a first view illustrating the method for manufacturing the V-ribbed belt of the first embodiment.

Next, referring to FIG. 4, the non-crosslinked rubber sheet 13' for back rubber layer 13 and the non-crosslinked rubber sheet 12' for adhesion rubber layer 12 are winded and stacked on an outer circumferential surface of a cylindrical mold 31 in this order. Then, the twisted yarns 14' for cord 14 are further spirally winded around the cylindrical mold 31 on which the non-crosslinked rubber sheets 12', 13' are stacked. Subsequently, the non-crosslinked rubber sheet 12' for adhesion rubber layer 12 and the non-crosslinked rubber sheet 11' for compression rubber layer 11 are further winded and stacked on the twisted yarns 14' in this order, thereby forming a molded body B' for belt formation. Note that, in the case where the short fibers 16 of the compression rubber layer 11 are oriented in the belt width direction, the non-crosslinked rubber sheet 11' for compression rubber layer 11 may be disposed such that an orientation direction of the short fibers 16 is coincident with an axial direction of the cylindrical mold 31.

Figure 5:
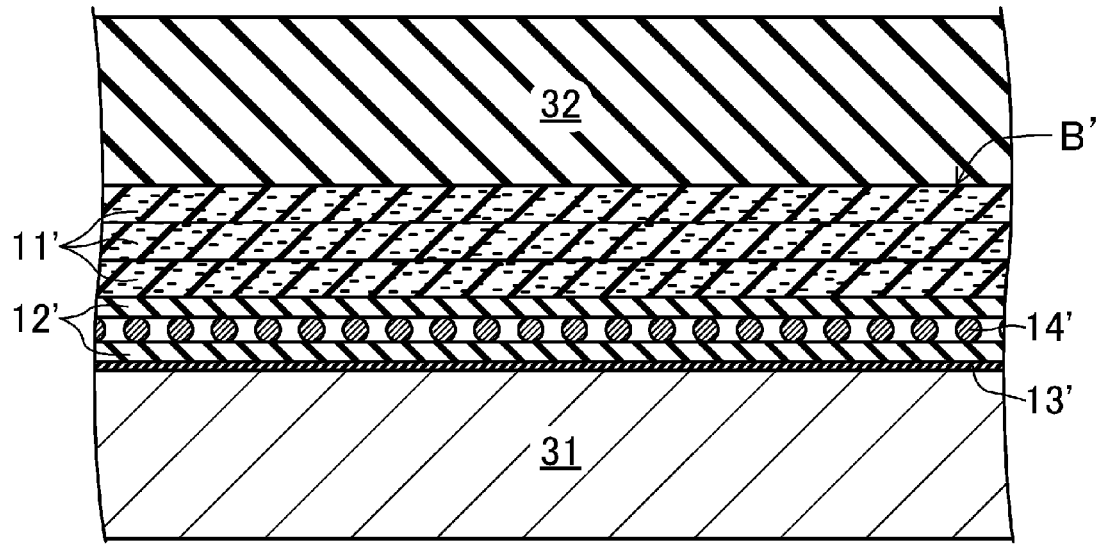
FIG. 5 is a second view illustrating the method for manufacturing the V-ribbed belt of the first embodiment.
Figure 6:
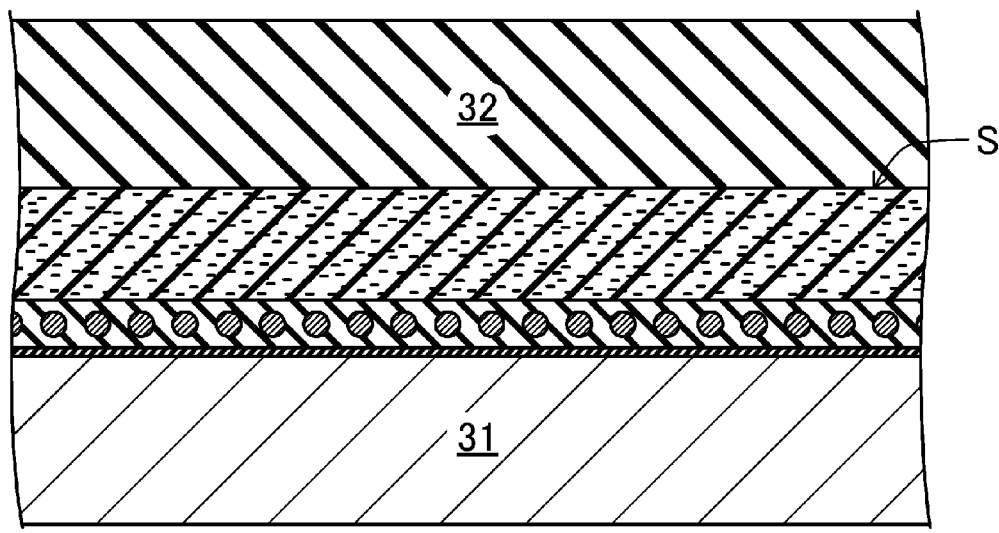
FIG. 6 is a third view illustrating the method for manufacturing the V-ribbed belt of the first embodiment.

Next, referring to FIG. 5, a rubber sleeve 32 is placed on the molded body B'. The rubber sleeve 32 placed on the molded body B' is hermetically disposed in a vulcanizer, and is held for a predetermined period of time with the vulcanizer being filled with high-temperature high-pressure vapor. In this state, crosslinking of the non-crosslinked rubber sheets 11', 12', 13' proceeds such that the non-crosslinked rubber sheets 11', 12', 13' are integrated together and are combined with the twisted yarns 14'. Eventually, a cylindrical belt slab S is molded as illustrated in FIG. 6. The molding temperature of the belt slab S is, e.g., 100 to 180° C., the molding pressure of the belt slab S is, e.g., 0.5 to 2.0 MPa, and the molding time of the belt slab S is, e.g., 10 to 60 minutes.

Next, the vapor is exhausted from the vulcanizer to release the belt slab S from the hermetically-sealed state, and then the belt slab S molded on the cylindrical mold 31 is taken out.

Figure 7:
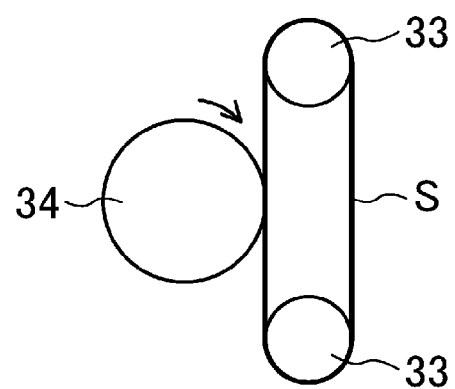
FIG. 7 is a fourth view illustrating the method for manufacturing the V-ribbed belt of the first embodiment.
Figure 8:
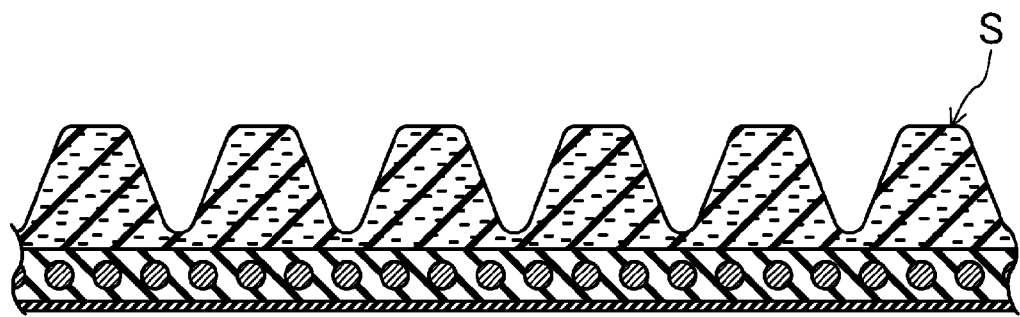
FIG. 8 is a fifth view illustrating the method for manufacturing the V-ribbed belt of the first embodiment.

Subsequently, referring to FIG. 7, the belt slab S is routed between a pair of slab suspension shafts 33. While rotating, a grinding wheel 34 in which V-rib-shaped grooves extending in a circumferential direction of the grinding wheel 34 and arranged in an axial direction of the grinding wheel 34 are formed at an outer circumferential surface of the grinding wheel 34 contacts an outer circumferential surface of the belt slab S. Meanwhile, the belt slab S also rotates between the slab suspension shafts 33. In this manner, the outer circumferential surface of the belt slab S is ground across the entire circumferential length thereof. At this point, referring to FIG. 8, V-ribs 15 are formed at the outer circumferential surface of the belt slab S, and the belt slab S is configured such that the short fibers 16 protrude from surfaces of the V-ribs 15. Note that the belt slab S may be, if necessary, divided in a length direction thereof, and then the divided pieces of the belt slab S may be ground.

Then, the belt slab S formed with the V-ribs 15 by grinding is cut into rings having a predetermined width, and each ring-shaped belt is turned inside out. As a result, V-ribbed belts B of the first embodiment are manufactured.

Second Embodiment

Figure 9:
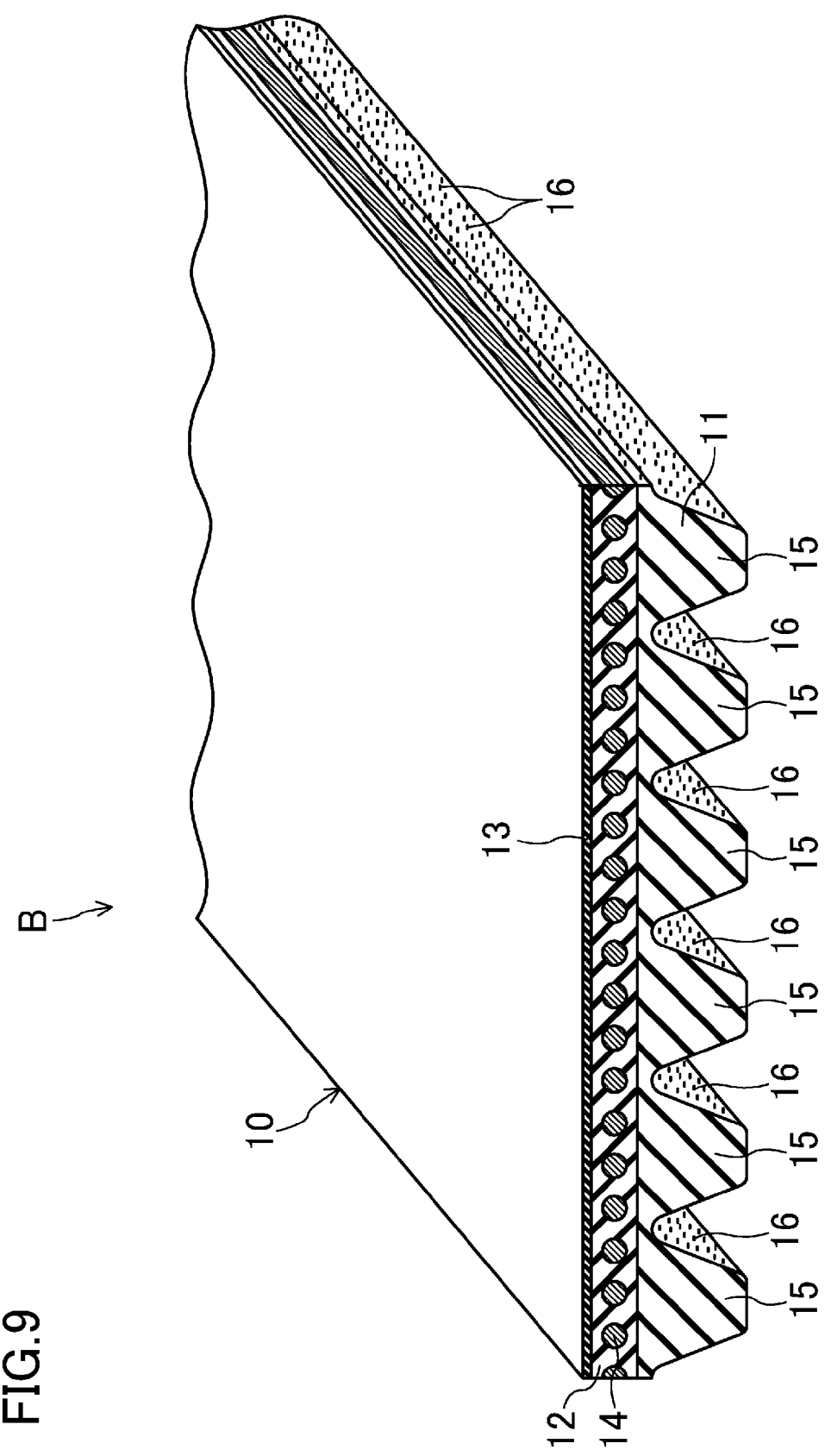
FIG. 9 is a perspective view illustrating a piece cut out of a V-ribbed belt of a second embodiment.
Figure 10:
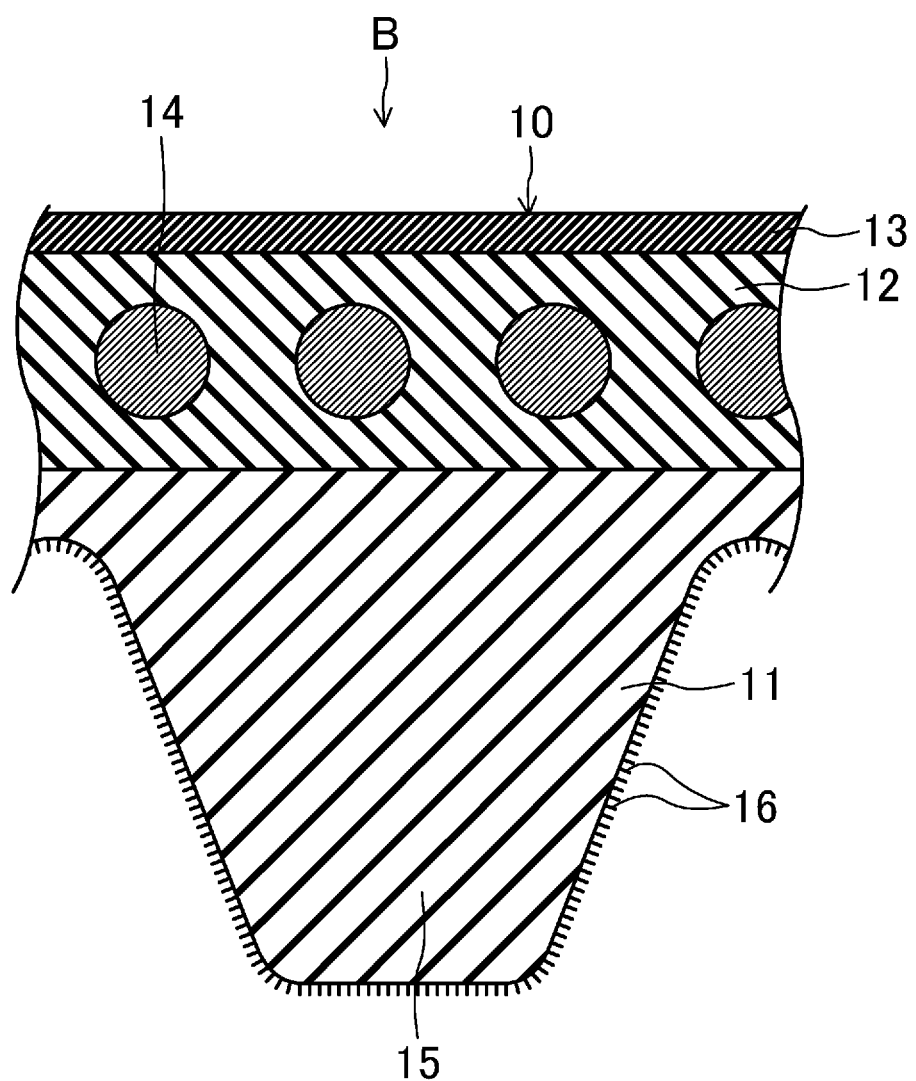
FIG. 10 is a partial cross-sectional view of the V-ribbed belt of the second embodiment.

FIGS. 9 and 10 illustrate a V-ribbed belt (friction transmission belt) B of a second embodiment. Note that the same reference numerals as those shown in the first embodiment are used to represent equivalent elements in the second embodiment. As in the V-ribbed belt B of the first embodiment, the V-ribbed belt B of the second embodiment is also used for, e.g., a belt transmission system for driving an accessory(ies) in an engine room of an automobile.

In the V-ribbed belt B of the second embodiment, no short fibers are mixed with a rubber composition forming a compression rubber layer 11. The V-ribbed belt B of the second embodiment has such a configuration that short fibers 16 adhere to surfaces of V-ribs 15 of the compression rubber layer 11 forming a pulley contact-side part and that the short fibers 16 are arranged so as to protrude from the surfaces of the V-ribs 15.

As in the first embodiment, the short fibers 16 consist of aramid short fibers and non-aramid synthetic short fibers having a standard moisture regain of equal to or less than 4%. The adhesion treatment for dipping the short fibers 16 in, e.g., an RFL aqueous solution and then heating the short fibers 16 may be or may not be applied to the short fibers 16. Such adhesion treatment may be applied to both of the aramid short fibers and the non-aramid synthetic short fibers, or may be applied to one of the aramid short fibers or the non-aramid synthetic short fibers. In terms of the total area occupancy of the short fibers 16 at the surfaces of the V-ribs 15 of the compression rubber layer 11 forming the pulley contact-side part, the amount of the adhered short fibers 16 is preferably 40 to 95%, and more preferably 60 to 90%.

Examples of the aramid short fibers include para-aramid short fibers and meta-aramid short fibers. The aramid short fibers may include only the para-aramid short fibers, only the meta-aramid short fibers, or both. The standard moisture regain of the para-aramid short fiber is 3%, and the standard moisture regain of the meta-aramid short fiber is 5.25%.

The length of the aramid short fiber is preferably 0.1 to 10 mm, and more preferably 0.5 to 5 mm. The diameter of the aramid short fiber is, e.g., 10 to 50 µm. In terms of the area occupancy of the aramid short fibers, the amount of the adhered aramid short fibers is preferably 30 to 80%, and more preferably 40 to 70%. In the case where the aramid short fibers include both of the para-aramid short fibers and the meta-aramid short fibers, the ratio of the amount of the adhered para-aramid short fibers to the amount of the adhered meta-aramid short fibers, i.e., Amount of Adhered Para-Aramid Short Fibers/Amount of Adhered Meta-Aramid Short Fibers, is preferably 1/9 to 10/0 in terms of an area occupancy ratio, and more preferably 5/5 to 7/3 in terms of the area occupancy ratio.

The non-aramid synthetic short fibers have a standard moisture regain of equal to or less than 4%. The non-aramid synthetic short fibers preferably have a standard moisture regain of equal to or less than 2%, and more preferably a standard moisture regain of equal to or less than 1%. Examples of the non-aramid synthetic short fibers having a standard moisture regain of equal to or less than 4% include polyester short fibers and acrylic short fibers. Of these fibers, polyester short fibers are preferable. The non-aramid synthetic short fibers may be formed of a single type of material, or may be formed of a mixture of plural types of material.

The length of the non-aramid synthetic short fiber is preferably 0.5 to 10 mm, and more preferably 1 to 3 mm. The diameter of the non-aramid synthetic short fiber is, e.g., 10 to 50 µm. In terms of the area occupancy of the non-aramid synthetic short fibers, the amount of the adhered non-aramid synthetic short fibers is preferably 15 to 65%, and more preferably 20 to 50%.

The length of the aramid short fiber may be longer than that of the non-aramid synthetic short fiber, may be shorter than that of the non-aramid synthetic short fiber, or may be equal to that of the non-aramid synthetic short fiber. The diameter of the aramid short fiber may be larger than that of the non-aramid synthetic short fiber, may be smaller than that of the non-aramid synthetic short fiber, or may be equal to that of the non-aramid synthetic short fiber. The amount of the adhered aramid short fibers may be greater than that of the adhered non-aramid synthetic short fibers, may be less than that of the adhered non-aramid synthetic short fibers, or may be equal to that of the adhered non-aramid synthetic short fibers. Note that the amount of the adhered aramid short fibers is preferably less than that of the adhered non-aramid synthetic short fibers. In terms of the area occupancy ratio, the ratio of the amount of the adhered aramid short fibers to the amount of the adhered non-aramid synthetic short fibers, i.e., Amount of Adhered Aramid Short Fibers/Amount of Adhered Non-Aramid Synthetic Short Fibers, is preferably 0.1 to 10, and more preferably 0.5 to 5.

The length of the protruding part of the short fiber 16 is preferably 0.01 to 5 mm, and more preferably 0.05 to 2 mm. The length of the protruding part of the aramid short fiber is preferably longer than that of the protruding part of the non-aramid synthetic short fiber. Specifically in this case, the length of the protruding part of the aramid short fiber is preferably 0.01 to 5 mm, and more preferably 0.05 to 2 mm. The length of the protruding part of the non-aramid synthetic short fiber is preferably 0.01 to 2 mm, and more preferably 0.05 to 1 mm. The length ratio of the protruding part of the aramid short fiber to the protruding part of the non-aramid synthetic short fiber, i.e., Length of Protruding Part of Aramid Short Fiber/Length of Protruding Part of Non-Aramid Synthetic Short Fiber, is preferably 1 to 10, and more preferably 3 to 6. Such a configuration can be realized in such a manner that the aramid short fibers are formed so as to have a length longer than that of the non-aramid synthetic short fibers.

According to the V-ribbed belt B of the second embodiment, since the short fibers 16 protruding from the surfaces of the V-ribs 15 of the compression rubber layer 11 forming the pulley contact-side part consist, as described above, of the aramid short fibers and the non-aramid synthetic short fibers having a standard moisture regain of equal to or less than 4%, slip noise generated due to the presence of water can be reduced.

Next, one example of the method for manufacturing the V-ribbed belt B of the second embodiment will be described with reference to FIGS. 11-16.

Figure 11:
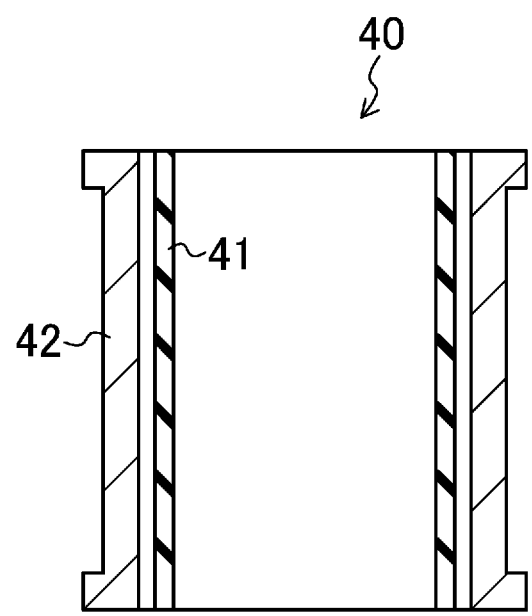
FIG. 11 is a longitudinal sectional view of a belt mold assembly used for manufacturing the V-ribbed belt of the second embodiment.
Figure 12:
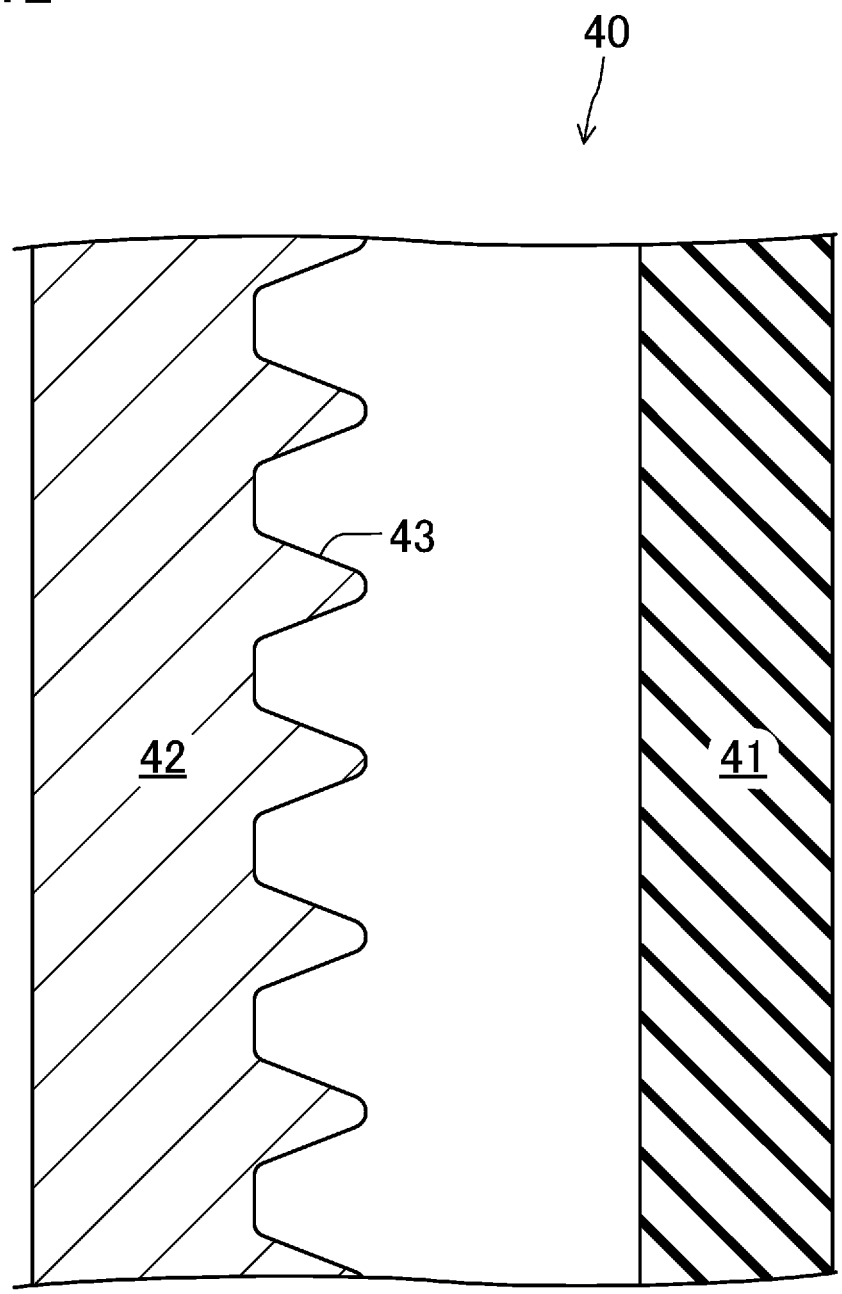
FIG. 12 is a partial longitudinal sectional view of the belt mold assembly used for manufacturing the V-ribbed belt of the second embodiment.

Referring to FIGS. 11 and 12, a belt mold assembly 40 including a flexible cylindrical inner mold 41 and an outer mold 42 and formed such that the inner mold 41 and the outer mold 42 are arranged concentric with each other is used in manufacturing of the V-ribbed belt B of the second embodiment.

In the belt mold assembly 40, the inner mold 41 is made of a flexible material such as rubber. An outer circumferential surface of the inner mold 41 forms a molding surface, and, e.g., a weave pattern of a woven fabric is formed at the outer circumferential surface of the inner mold 41. The outer mold 42 is made of a rigid material such as metal. An inner circumferential surface of the outer mold 42 forms a molding surface, and a V-rib formation surface 43 is formed at the inner circumferential surface of the outer mold 42. In the outer mold 42, a temperature control mechanism configured to circulate a heat medium such as water vapor or a cooling medium such as water to control a temperature is provided. In the belt mold assembly 40, a pressurizing unit configured to pressurize and expand the inner mold 41 from the inside is provided.

In manufacturing of the V-ribbed belt B of the second embodiment, a rubber component is first mixed and kneaded with compounding ingredients using a kneading machine such as a kneader or a Banbury mixer. The resultant non-crosslinked rubber composition is formed into a sheet by, e.g., calendering, thereby forming a non-crosslinked rubber sheet 11' for compression rubber layer 11. Similarly, a non-crosslinked rubber sheet 12' for adhesion rubber layer 12 and a non-crosslinked rubber sheet 13' for back rubber layer 13 are formed. After the adhesion treatment for dipping twisted yarns 14' to be a cord 14 in an RFL aqueous solution and then heating the twisted yarns 14', the adhesion treatment for dipping the twisted yarns 14' in rubber cement and then heating and drying the twisted yarns 14' is performed.

Figure 13:
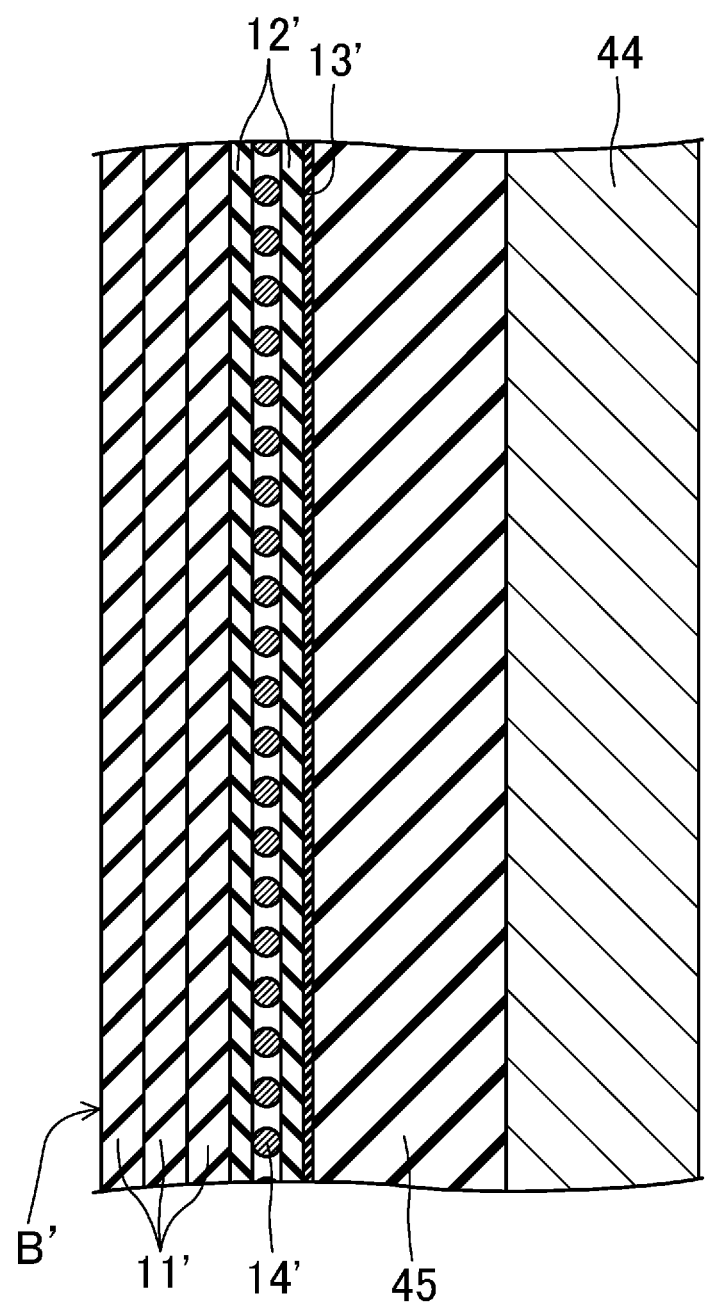
FIG. 13 is a first view illustrating the method for manufacturing the V-ribbed belt of the second embodiment.

Next, referring to FIG. 13, a rubber sleeve 45 is placed on a cylindrical drum 44 having a smooth surface, and the non-crosslinked rubber sheet 13' for back rubber layer 13 and the non-crosslinked rubber sheet 12' for adhesion rubber layer 12 are winded and stacked on the rubber sleeve 45 in this order. Then, the twisted yarns 14' for cord 14 are spirally winded around the cylindrical drum 44 on which the non-crosslinked rubber sheets 12', 13' are stacked. Moreover, the non-crosslinked rubber sheet 12' for adhesion rubber layer 12 and the non-crosslinked rubber sheet 11' for compression rubber layer 11 are winded and stacked on the twisted yarns 14' in this order, thereby forming a molded body B' for belt formation.

Figure 14:
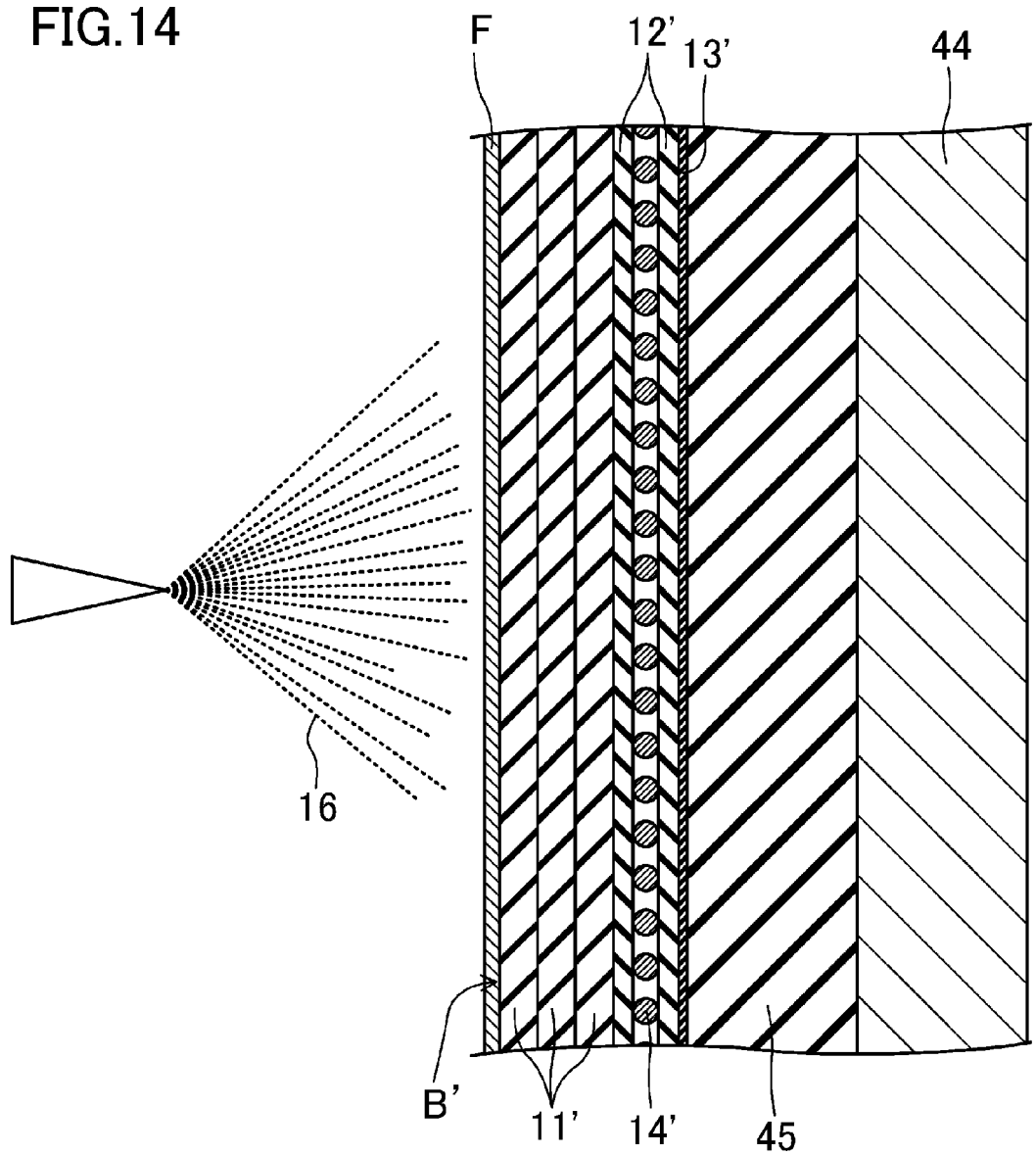
FIG. 14 is a second view illustrating the method for manufacturing the V-ribbed belt of the second embodiment.

Next, referring to FIG. 14, short fibers 16 are sprayed to a surface of the non-crosslinked rubber sheet 11' for non-crosslinked rubber sheet 11' provided on the outermost side of the molded body B'. In this state, a short fiber layer F is formed on the surface of the molded body B'. Considering enhancement of adhesiveness to the molded body B', the short fibers 16 to be sprayed are preferably charged with, e.g., a voltage of 10 to 100 kV. The short fibers 16 can be sprayed using typical powder coating equipment. Note that aramid short fibers and non-aramid synthetic short fibers may be sprayed at the same timing, or may be sprayed at different timings. Instead of spraying the short fibers 16 to the molded body B', short fibers may be sprayed to the inner circumferential surface of the outer mold 42.

Figure 15:
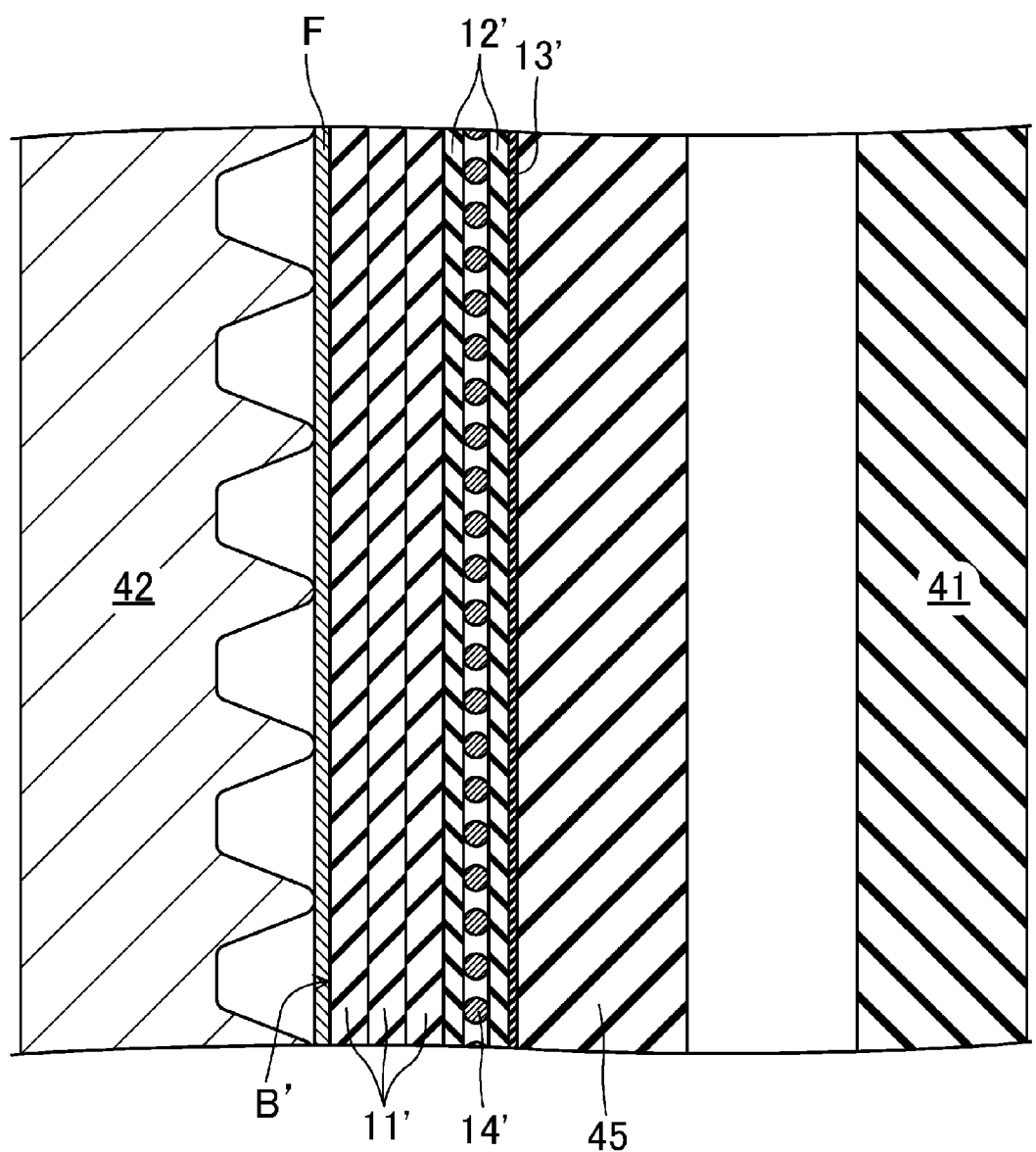
FIG. 15 is a third view illustrating the method for manufacturing the V-ribbed belt of the second embodiment.
Figure 16:
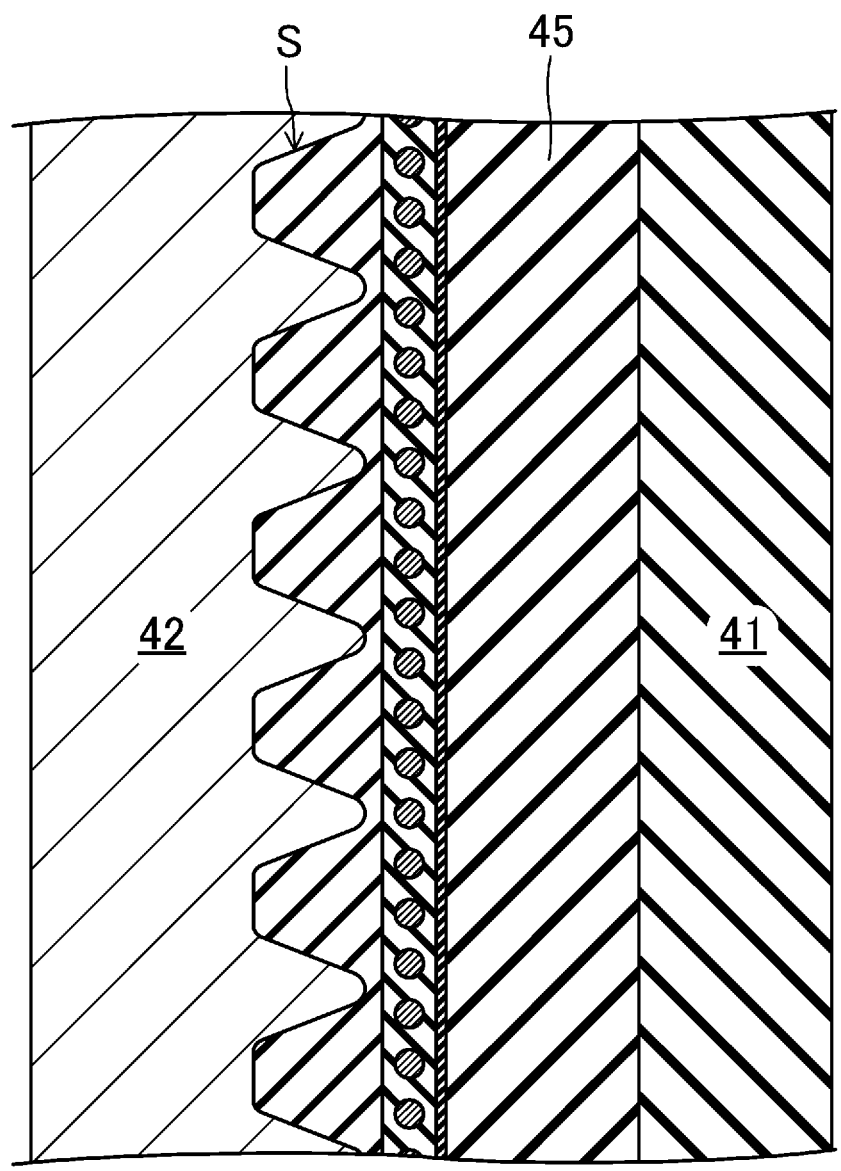
FIG. 16 is a fourth view illustrating the method for manufacturing the V-ribbed belt of the second embodiment.

Next, referring to FIG. 15, the rubber sleeve 45 on which the molded body B' sprayed with the short fibers 16 is stacked is removed from the cylindrical drum 44, and then is placed in the outer mold 42. Subsequently, the inner mold 41 is placed in the rubber sleeve 45 placed in the outer mold 42, and then is hermetically sealed.

Subsequently, the outer mold 42 is heated to a predetermined temperature while, e.g., high-pressure air is introduced into the hermetically-sealed inner space of the inner mold 41 to pressurize the inner mold 41. This state is held for a predetermined period of time. The inner mold 41 expands to compress the molded body B' against the molding surface of the outer mold 42. Meanwhile, crosslinking of the non-crosslinked rubber sheets 11', 12', 13' proceeds such that the non-crosslinked rubber sheets 11', 12', 13' are integrated together and are combined with the twisted yarns 14' and the short fibers 16. Eventually, referring to FIG. 16, a cylindrical belt slab S formed, on an inner circumferential side thereof, with V-ribs 15 combined with the short fibers 16 is molded. The molding temperature of the belt slab S is, e.g., 100 to 180° C., the molding pressure of the belt slab S is, e.g., 0.5 to 2.0 MPa, and the molding time of the belt slab S is, e.g., 10 to 60 minutes.

The inner pressure of the inner mold 41 is reduced so that the inner mold 41 is released from the hermetically-sealed state. The belt slab S molded between the inner mold 41 and the outer mold 42 is taken out. The belt slab S is cut into rings each having a predetermined width, and each ring-shaped belt is turned inside out. As a result, V-ribbed belts B are manufactured.

Other configurations, features, and advantages are the same as those of the first embodiment.

Other Embodiments

The first and second embodiments are targeted for the V-ribbed belt B. However, even other friction transmission belts such as V-belts and flat belts can realize similar features and advantages.

EXAMPLES (V-Ribbed Belts)
V-ribbed belts of Examples 1-7 and Comparative Examples 1-5 were formed. Tables 1 and 2 show the configuration of each V-ribbed belt.

Example 1

A non-crosslinked rubber sheet for compression rubber layer contains EPDM ("EPT3045" manufactured by Mitsui Chemicals, Inc.) as a rubber component. The followings were mixed with 100 parts by mass of the rubber component: 60 parts by mass of HAF carbon black ("SEAST SO" manufactured by Tokai Carbon Co., Ltd.); 2 parts by mass of an antioxidant ("NOCRAC MB" manufactured by Ouchi Shinko Chemical Industrial Co., Ltd.); 10 parts by mass of paraffin-based oil ("Diana Process Oil PS-90" manufactured by Idemitsu Kosan Co., Ltd.) as a softener; 2.3 parts by mass of sulfur ("Oil Sulfur" manufactured by Hosoi Chemical Industry Co., Ltd.); 1.4 parts by mass of a vulcanization accelerator ("Sunceller EM-2" manufactured by Sanshin Chemical Industry Co., Ltd.); 5 parts by mass of zinc oxide ("Zinc White No. 2" manufactured by Sakai Chemical Industry Co., Ltd.) as a vulcanization assistant; 3 parts by mass of para-aramid short fibers ("Technora" manufactured by Teijin Ltd., having a length of 3 mm and a diameter of 14.3 µm, and having a standard moisture regain of 3.0%); and 22 parts by mass of polyester short fibers (manufactured by Teijin Ltd., having a length of 1 mm and a diameter of 27.3 µm, and having a standard moisture regain of 0.4%) as non-aramid synthetic short fibers. The foregoing mixture was kneaded using a Banburry mixer. Then, the resultant was rolled using a calender rolls.

Similarly, non-crosslinked rubber sheets made of an EPDM rubber composition were prepared for an adhesion rubber layer and a back rubber layer. Moreover, twisted yarns of polyester fibers to which the adhesion treatment using an RFL aqueous solution is applied were prepared for a cord.

In the method similar to that of the first embodiment, V-ribbed belts each including the compression rubber layer made of the EPDM rubber composition containing the short fibers were formed, and were used as V-ribbed belts of Example 1.

The V-ribbed belts of Example 1 had a circumferential length of 1200 mm and a thickness of 4.3 mm. The following two types of V-ribbed belts were formed as the V-ribbed belts of Example 1: a V-ribbed belt having three V-ribs and having a width of 10.68 mm; and a V-ribbed belt having six V-ribs and having a width of 21.36 mm.

In the V-ribbed belts of Example 1, the length ratio of the aramid short fiber to the non-aramid synthetic short fiber was 3.0, and the diameter ratio of the aramid short fiber to the non-aramid synthetic short fiber was 0.52. The total mixing amount of the short fibers with respect to 100 parts by mass of the rubber component was 25 parts by mass, and the mixing mass ratio of the aramid short fibers to the non-aramid synthetic short fibers was 0.14. The length of a protruding part of the aramid short fiber was 0.7 mm, and the length of a protruding part of the non-aramid synthetic short fiber was 0.2 mm. The length ratio of the protruding part of the aramid short fiber to the protruding part of the non-aramid synthetic short fiber was 3.5. The total area occupancy of the short fibers was 83%, the area occupancy of the aramid short fibers was 35%, and the area occupancy of the non-aramid synthetic short fibers was 48%. The area occupancy ratio of the aramid short fibers to the non-aramid synthetic short fibers was 0.73.

Example 2

A V-ribbed belt was formed in the manner similar to that of Example 1, except that the mixing amount of aramid short fibers in a non-crosslinked rubber sheet for compression rubber layer was 5 parts by mass with respect to 100 parts by mass of a rubber component and that the mixing amount of polyester short fibers in the non-crosslinked rubber sheet for compression rubber layer was 20 parts by mass with respect to 100 parts by mass of the rubber component. Such a V-ribbed belt was used as a V-ribbed belt of Example 2.

In the V-ribbed belt of Example 2, the length ratio of the aramid short fiber to the non-aramid synthetic short fiber was 3.0, and the diameter ratio of the aramid short fiber to the non-aramid synthetic short fiber was 0.52. The total mixing amount of the short fibers with respect to 100 parts by mass of the rubber component was 25 parts by mass, and the mixing mass ratio of the aramid short fibers to the non-aramid synthetic short fibers was 0.25. The length of a protruding part of the aramid short fiber was 0.7 mm, and the length of a protruding part of the non-aramid synthetic short fiber was 0.2 mm. The length ratio of the protruding part of the aramid short fiber to the protruding part of the non-aramid synthetic short fiber was 3.5. The total area occupancy of the short fibers was 90%, the area occupancy of the aramid short fibers was 45%, and the area occupancy of the non-aramid synthetic short fibers was 45%. The area occupancy ratio of the aramid short fibers to the non-aramid synthetic short fibers was 1.00.

Example 3

A V-ribbed belt was formed in the manner similar to that of Example 2, except that a non-crosslinked rubber sheet for compression rubber layer contained 45 parts by mass of HAF carbon black with respect to 100 parts by mass of a rubber component and that 30 parts by mass of calcium carbonate ("Hakuenka CC" manufactured by Shiraishi Calcium Kaisha, Ltd.) was mixed with 100 parts by mass of the rubber component as a filler. Such a V-ribbed belt was used as a V-ribbed belt of Example 3.

In the V-ribbed belt of Example 3, the length ratio of aramid short fiber to non-aramid synthetic short fiber was 3.0, and the diameter ratio of the aramid short fiber to the non-aramid synthetic short fiber was 0.52. The total mixing amount of the short fibers with respect to 100 parts by mass of the rubber component was 25 parts by mass, and the mixing mass ratio of the aramid short fibers to the non-aramid synthetic short fibers was 0.25. The length of a protruding part of the aramid short fiber was 0.7 mm, and the length of a protruding part of the non-aramid synthetic short fiber was 0.2 mm. The length ratio of the protruding part of the aramid short fiber to the protruding part of the non-aramid synthetic short fiber was 3.5. The total area occupancy of the short fibers was 90%, the area occupancy of the aramid short fibers was 45%, and the area occupancy of the non-aramid synthetic short fibers was 45%. The area occupancy ratio of the aramid short fibers to the non-aramid synthetic short fibers was 1.00.

Example 4

A V-ribbed belt was formed in the manner similar to that of Example 2, except that a non-crosslinked rubber sheet for compression rubber layer contained 45 parts by mass of HAF carbon black with respect to 100 parts by mass of a rubber component and that 30 parts by mass of bentonite ("Bengel A" manufactured by Hojun Co., Ltd.) was mixed with 100 parts by mass of the rubber component as a filler. Such a V-ribbed belt was used as a V-ribbed belt of Example 4.

In the V-ribbed belt of Example 4, the length ratio of aramid short fiber to non-aramid synthetic short fiber was 3.0, and the diameter ratio of the aramid short fiber to the non-aramid synthetic short fiber was 0.52. The total mixing amount of the short fibers with respect to 100 parts by mass of the rubber component was 25 parts by mass, and the mixing mass ratio of the aramid short fibers to the non-aramid synthetic short fibers was 0.25. The length of a protruding part of the aramid short fiber was 0.7 mm, and the length of a protruding part of the non-aramid synthetic short fiber was 0.2 mm. The length ratio of the protruding part of the aramid short fiber to the protruding part of the non-aramid synthetic short fiber was 3.5. The total area occupancy of the short fibers was 90%, the area occupancy of the aramid short fibers was 45%, and the area occupancy of the non-aramid synthetic short fibers was 45%. The area occupancy ratio of the aramid short fibers to the non-aramid synthetic short fibers was 1.00.

Example 5

A V-ribbed belt was formed in the manner similar to that of Example 2, except that grinding conditions were relaxed to reduce sharp-cutting of short fibers. Such a V-ribbed belt was used as a V-ribbed belt of Example 5.

In the V-ribbed belt of Example 5, the length ratio of aramid short fiber to non-aramid synthetic short fiber was 3.0, and the diameter ratio of the aramid short fiber to the non-aramid synthetic short fiber was 0.52. The total mixing amount of the short fibers with respect to 100 parts by mass of a rubber component was 25 parts by mass, and the mixing mass ratio of the aramid short fibers to the non-aramid synthetic short fibers was 0.25. The length of a protruding part of the aramid short fiber was 1.5 mm, and the length of a protruding part of the non-aramid synthetic short fiber was 0.3 mm. The length ratio of the protruding part of the aramid short fiber to the protruding part of the non-aramid synthetic short fiber was 5. The total area occupancy of the short fibers was 98%, the area occupancy of the aramid short fibers was 52%, and the area occupancy of the non-aramid synthetic short fibers was 46%. The area occupancy ratio of the aramid short fibers to the non-aramid synthetic short fibers was 1.13.

Example 6

A V-ribbed belt was formed in the manner similar to that of Example 1, except that a non-crosslinked rubber sheet for compression rubber layer contained 25 parts by mass of aramid short fibers with respect to 100 parts by mass of a rubber component and contained 10 parts by mass of polyester short fibers with respect to 100 parts by mass of the rubber component. Such a V-ribbed belt was used as a V-ribbed belt of Example 6.

In the V-ribbed belt of Example 6, the length ratio of the aramid short fiber to the non-aramid synthetic short fiber was 3.0, and the diameter ratio of the aramid short fiber to the non-aramid synthetic short fiber was 0.52. The total mixing amount of the short fibers with respect to 100 parts by mass of the rubber component was 35 parts by mass, and the mixing mass ratio of the aramid short fibers to the non-aramid synthetic short fibers was 2.5. The length of a protruding part of the aramid short fiber was 0.7 mm, and the length of a protruding part of the non-aramid synthetic short fiber was 0.2 mm. The length ratio of the protruding part of the aramid short fiber to the protruding part of the non-aramid synthetic short fiber was 3.5. The total area occupancy of the short fibers was 99%, the area occupancy of the aramid short fibers was 70%, and the area occupancy of the non-aramid synthetic short fibers was 29%. The area occupancy ratio of the aramid short fibers to the non-aramid synthetic short fibers was 2.41.

Example 7

A V-ribbed belt was formed in the manner similar to that of Example 1, except that a non-crosslinked rubber sheet for compression rubber layer contained 5 parts by mass of aramid short fibers with respect to 100 parts by mass of a rubber component and contained 55 parts by mass of polyester short fibers with respect to 100 parts by mass of the rubber component. Such a V-ribbed belt was used as a V-ribbed belt of Example 7.

In the V-ribbed belt of Example 7, the length ratio of the aramid short fiber to the non-aramid synthetic short fiber was 3.0, and the diameter ratio of the aramid short fiber to the non-aramid synthetic short fiber was 0.52. The total mixing amount of the short fibers with respect to 100 parts by mass of the rubber component was 60 parts by mass, and the mixing mass ratio of the aramid short fibers to the non-aramid synthetic short fibers was 0.09. The length of a protruding part of the aramid short fiber was 0.7 mm, and the length of a protruding part of the non-aramid synthetic short fiber was 0.2 mm. The length ratio of the protruding part of the aramid short fiber to the protruding part of the non-aramid synthetic short fiber was 3.5. The total area occupancy of the short fibers was 85%, the area occupancy of the aramid short fibers was 35%, and the area occupancy of the non-aramid synthetic short fibers was 50%. The area occupancy ratio of the aramid short fibers to the non-aramid synthetic short fibers was 0.70.

Comparative Example 1

A V-ribbed belt was formed in the manner similar to that of Example 1, except that a non-crosslinked rubber sheet for compression rubber layer contained no aramid short fibers and contained 25 parts by mass of polyester short fibers with respect to 100 parts by mass of a rubber component. Such a V-ribbed belt was used as a V-ribbed belt of Comparative Example 1.

In the V-ribbed belt of Comparative Example 1, the length of a protruding part of the non-aramid synthetic short fiber was 0.2 mm, and the total area occupancy of the short fibers was 62%.

Comparative Example 2

A V-ribbed belt was formed in the manner similar to that of Comparative Example 1, except that a non-crosslinked rubber sheet for compression rubber layer contained, instead of polyester short fibers, nylon short fibers ("Leona 66" manufactured by Asahi Kasai Corporation, having a length of 1 mm and a diameter of 27.3 μm, and having a standard moisture regain of 4.5%) as non-aramid synthetic short fibers. Such a V-ribbed belt was used as a V-ribbed belt of Comparative Example 2.

In the V-ribbed belt of Comparative Example 2, the length of a protruding part of the non-aramid synthetic short fiber was 0.2 mm, and the total area occupancy of the short fibers was 71%.

Comparative Example 3

A V-ribbed belt was formed in the manner similar to that of Comparative Example 1, except that a non-crosslinked rubber sheet for compression rubber layer contained, instead of polyester short fibers, cotton short fibers (cotton powder having a standard moisture regain of 8.5%) as non-aramid synthetic short fibers. Such a V-ribbed belt was used as a V-ribbed belt of Comparative Example 3.

In the V-ribbed belt of Comparative Example 3, the length of a protruding part of the non-aramid synthetic short fiber was 0.05 mm, and the total area occupancy of the short fibers was 52%.

Comparative Example 4

A V-ribbed belt was formed in the manner similar to that of Example 1, except that a non-crosslinked rubber sheet for compression rubber layer contained no polyester short fibers and contained 15 parts by mass of aramid short fibers with respect to 100 parts by mass of a rubber component. Such a V-ribbed belt was used as a V-ribbed belt of Comparative Example 4.

In the V-ribbed belt of Comparative Example 4, the length of a protruding part of the aramid short fiber was 0.7 mm, and the total area occupancy of the short fibers was 89%.

Comparative Example 5

A V-ribbed belt was formed in the manner similar to that of Example 2, except that a non-crosslinked rubber sheet for compression rubber layer contained, instead of polyester short fibers, nylon short fibers as non-aramid synthetic short fibers. Such a V-ribbed belt was used as a V-ribbed belt of Comparative Example 5.

In the V-ribbed belt of Comparative Example 5, the length ratio of an aramid short fiber to the non-aramid synthetic short fiber was 3.0, and the diameter ratio of the aramid short fiber to the non-aramid synthetic short fiber was 0.52. The total mixing amount of the short fibers with respect to 100 parts by mass of a rubber component was 25 parts by mass, and the mixing mass ratio of the aramid short fibers to the non-aramid synthetic short fibers was 0.25. The length of a protruding part of the aramid short fiber was 0.7 mm, and the length of a protruding part of the non-aramid synthetic short fiber was 0.2 mm. The length ratio of the protruding part of the aramid short fiber to the protruding part of the non-aramid synthetic short fiber was 3.5. The total area occupancy of the short fibers was 89%, the area occupancy of the aramid short fibers was 45%, and the area occupancy of the non-aramid synthetic short fibers was 44%. The area occupancy ratio of the aramid short fibers to the non-aramid synthetic short fibers was 1.02.

TABLE 1

|  | EXAMPLES | | | | | | | COMPARATIVE EXAMPLES | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| EPDM | 100 | 100 | 100 | 100 | 100 | 100 | 100 | 100 | 100 | 100 | 100 | 100 |
| HAF CARBON BLACK | 60 | 60 | 45 | 45 | 60 | 60 | 60 | 60 | 60 | 60 | 60 | 60 |
| CALCIUM CARBONATE |  |  | 30 |  |  |  |  |  |  |  |  |  |
| BENTONITE |  |  |  | 30 |  |  |  |  |  |  |  |  |
| ANTIOXIDANT | 2 | 2 | 2 | 2 | 2 | 2 | 2 | 2 | 2 | 2 | 2 | 2 |
| PARAFFIN-BASED OIL | 10 | 10 | 10 | 10 | 10 | 10 | 10 | 10 | 10 | 10 | 10 | 10 |
| SULFUR | 2.3 | 2.3 | 2.3 | 2.3 | 2.3 | 2.3 | 2.3 | 2.3 | 2.3 | 2.3 | 2.3 | 2.3 |
| VULCANIZATION ACCELERATOR | 1.4 | 1.4 | 1.4 | 1.4 | 1.4 | 1.4 | 1.4 | 1.4 | 1.4 | 1.4 | 1.4 | 1.4 |
| ZINC OXIDE | 5 | 5 | 5 | 5 | 5 | 5 | 5 | 5 | 5 | 5 | 5 | 5 |
| ARAMID SHORT FIBERS | 3 | 5 | 5 | 5 | 5 | 25 | 5 |  |  |  | 15 | 5 |
| POLYESTER SHORT FIBERS | 22 | 20 | 20 | 20 | 20 | 10 | 55 | 25 |  |  |  |  |
| NYLON SHORT FIBERS |  |  |  |  |  |  |  |  | 25 |  |  | 25 |
| COTTON SHORT FIBERS |  |  |  |  |  |  |  |  |  | 25 |  |  |

TABLE 2

|  |  | EXAMPLES | | | | | | | COMPARATIVE EXAMPLES | | | | |
| --- | --- | --- | --- | --- | --- | --- | --- | --- | --- | --- | --- | --- | --- |
|  |  | 1 | 2 | 3 | 4 | 5 | 6 | 7 | 1 | 2 | 3 | 4 | 5 |
| FIBER LENGTH (mm) | ARAMID SHORT FIBERS | 3 | 3 | 3 | 3 | 3 | 3 | 3 |  |  |  | 3 | 3 |
|  | NON-ARAMID SHORT FIBERS | 1 | 1 | 1 | 1 | 1 | 1 | 1 | 1 | 1 | 1 |  | 1 |
|  | RATIO | 3 | 3 | 3 | 3 | 3 | 3 | 3 |  |  |  |  | 3 |
| FIBER DIAMETER (nm) | ARAMID SHORT FIBERS | 14.3 | 14.3 | 14.3 | 14.3 | 14.3 | 14.3 | 14.3 |  |  |  | 14.3 | 14.3 |
|  | NON-ARAMID SHORT FIBERS | 27.3 | 27.3 | 27.3 | 27.3 | 27.3 | 27.3 | 27.3 | 27.3 | 27.3 | 10.5 |  | 27.3 |
|  | RATIO | 0.52 | 0.52 | 0.52 | 0.52 | 0.52 | 0.52 | 0.52 |  |  |  |  | 0.52 |

TABLE 2-continued

| | | EXAMPLES | | | | | | | COMPARATIVE EXAMPLES | | | | |
|---|---|---|---|---|---|---|---|---|---|---|---|---|---|
| | | 1 | 2 | 3 | 4 | 5 | 6 | 7 | 1 | 2 | 3 | 4 | 5 |
| MIXING AMOUNT (PARTS BY MASS) | TOTAL | 25 | 25 | 25 | 25 | 25 | 35 | 60 | 25 | 25 | 25 | 15 | 25 |
| | ARAMID SHORT FIBERS | 3 | 5 | 5 | 5 | 5 | 25 | 5 | | | | 15 | 5 |
| | NON-ARAMID SHORT FIBERS | 22 | 20 | 20 | 20 | 20 | 10 | 55 | 25 | 25 | 25 | | 20 |
| | RATIO | 0.14 | 0.25 | 0.25 | 0.25 | 0.25 | 2.5 | 0.09 | | | | | 0.25 |
| PROTRUDING PART LENGTH (mm) | ARAMID SHORT FIBERS | 0.7 | 0.7 | 0.7 | 0.7 | 0.7 | 0.7 | 0.7 | | | | 0.7 | 0.7 |
| | NON-ARAMID SHORT FIBERS | 0.2 | 0.2 | 0.2 | 0.2 | 0.3 | 0.2 | 0.2 | 0.2 | 0.2 | 0.05 | | 0.2 |
| | RATIO | 3.5 | 3.5 | 3.5 | 3.5 | 3.5 | 3.5 | 3.5 | | | | | 3.5 |
| AREA OCCUPANCY (%) | TOTAL | 83 | 90 | 90 | 90 | 98 | 99 | 85 | 62 | 71 | 52 | 89 | 89 |
| | ARAMID SHORT FIBERS | 35 | 45 | 45 | 45 | 52 | 70 | 35 | | | | 89 | 45 |
| | NON-ARAMID SHORT FIBERS | 48 | 45 | 45 | 45 | 46 | 29 | 50 | 62 | 71 | 52 | | 44 |
| | RATIO | 0.73 | 1.00 | 1.00 | 1.00 | 1.13 | 2.41 | 0.70 | | | | | 1.02 |

(Test Evaluation Methods)

<Noise Test Under the Presence of Water>

Figure 17:
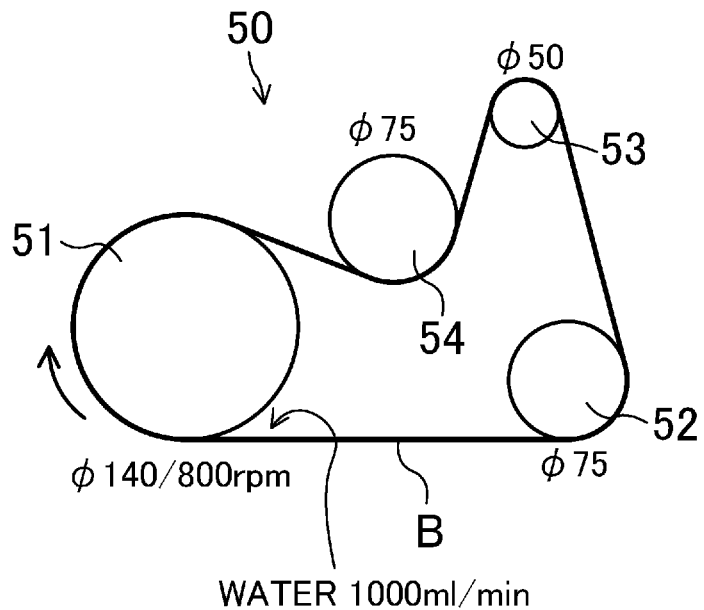
FIG. 17 is a view illustrating the layout of pulleys in a belt running tester for testing noise under the presence of water.

FIG. 17 illustrates the layout of pulleys in a belt running tester 50 for testing noise under the presence of water.

The belt running tester 50 includes a drive pulley 51 which is a ribbed pulley having a diameter of 140 mm, a first driven pulley 52 which is a ribbed pulley provided on the right side of the drive pulley 51 and having a diameter of 75 mm, a second driven pulley 53 which is a ribbed pulley provided above the first driven pulley 52 on the upper right side of the drive pulley 51 and having a diameter of 50 mm, and an idler pulley 54 which is a flat pulley provided between the drive pulley 51 and the second driven pulley 53 and having a diameter of 75 mm. In the belt running tester 50, a V-ribbed belt B is wrapped such that a V-rib-side surface thereof contacts the drive pulley 51 and the first and second driven pulleys 52, 53 which are the ribbed pulleys and that a back surface thereof contacts the idler pulley 54 which is the flat pulley.

Each V-ribbed belt of Examples 1-7 and Comparative Examples 1-5 having six V-ribs was placed in the belt running tester 50. The pulleys were positioned such that a belt tension of 49 N is loaded to each V-rib, and resistance was provided to the second driven pulley 53 such that a current of 60 A flows through an alternator attached to the second driven pulley 53. Under room temperature, a water of 1000 ml per minute was dropped onto a V-rib-side part of the V-ribbed belt B which is about to enter the drive pulley 51. Meanwhile, the drive pulley 51 rotated at a rotational speed of 800 rpm to run the V-ribbed belt B. A noise generation state during belt running was evaluated at the following three levels: "A" indicating that no noise is generated; "B" indicating that noise is slightly generated; and "C" indicating that noise is generated.

<Transmission Capacity Test>

Figure 19:
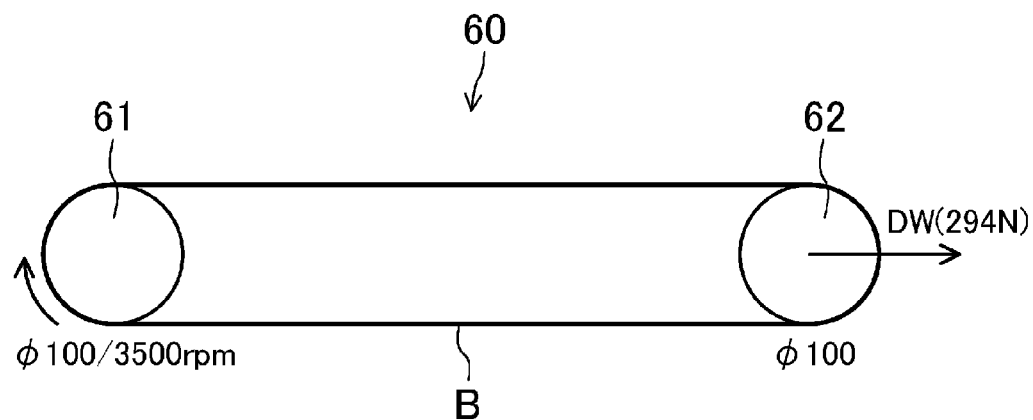
FIG. 19 is a view illustrating the layout of pulleys in a belt running tester for testing heat resistance and durability.

FIG. 19 illustrates the layout of pulleys in a belt running tester 60 for testing a transmission capacity.

The belt running tester 60 includes a drive pulley 61 and a driven pulley 62 which are ribbed pulleys spaced from each other in the horizontal direction and having a diameter of 100 mm. In the belt running tester 60, a V-ribbed belt B is wrapped such that a V-rib-side surface thereof contacts the drive pulley 61 and the driven pulley 62.

Each V-ribbed belt of Examples 1-7 and Comparative Examples 1-5 having six V-ribs was placed in the belt running tester 60. A deadweight of 294 N was laterally loaded to the driven pulley 62 such that belt tension is loaded to the V-ribbed belt. Under room temperature, the drive pulley 61 rotated at a rotational speed of 3500 rpm to run the V-ribbed belt B. Meanwhile, the load applied to the driven pulley 62 was gradually increased. In this state, the V-ribbed belt B come to slip on the drive pulley 61 and the driven pulley 62 as the load increased. The load when a slip ratio reached 2% was converted into a delivered horsepower, and the delivered horsepower was obtained as the transmission capacity.

<Heat Resistance and Durability Test>

Figure 18:
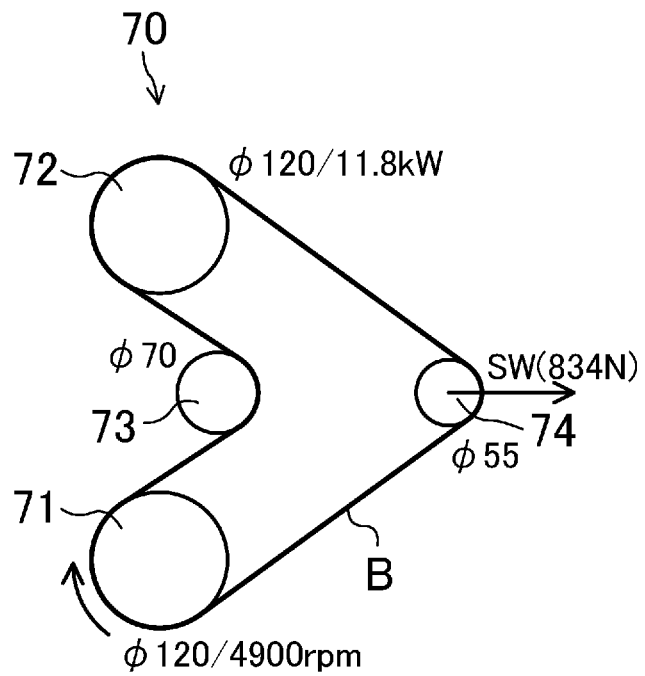
FIG. 18 is a view illustrating the layout of pulleys in a belt running tester for testing a transmission capacity.

FIG. 18 illustrates the layout of pulleys in a belt running tester 70 for testing heat resistance and durability.

The belt running tester 70 includes a drive pulley 71 which is a ribbed pulley having a diameter of 120 mm, a first driven pulley 72 which is a ribbed pulley provided above the drive pulley 71 and having a diameter of 120 mm, an idler pulley 73 which is a flat pulley provided in the middle between the drive pulley 71 and the first driven pulley 72 in the vertical direction and having a diameter of 70 mm, and a second driven pulley 74 which is a ribbed pulley provided on the right side of the idler pulley 73 and having a diameter of 55 mm. In the belt running tester 70, a V-ribbed belt B is wrapped such that a V-rib-side surface thereof contacts the drive pulley 71 and the first and second driven pulleys 72, 74 which are the ribbed pulleys and that a back surface thereof contacts the idler pulley 73 which is the flat pulley. Each of the idler pulley 73 and the second driven pulley 74 is positioned such that the wrapping angle of the V-ribbed belt B on each of the idler pulley 73 and the second driven pulley 74 is 90°.

Each V-ribbed belt of Examples 1-7 and Comparative Examples 1-5 having three V-ribs was placed in the belt running tester 70. A set weight of 834 N was laterally loaded to the second driven pulley 74 such that belt tension is loaded to the V-ribbed belt, and a rotational load of 11.8 kW was provided to the first driven pulley 72. Under an atmospheric temperature of 120° C., the drive pulley 71 rotated at a rotational speed of 4900 rpm to run the V-ribbed belt B. A running time until a crack(s) generated in the compression rubber layer of the V-ribbed belt B reaches the cord was measured.

<Flex Resistance Test>

Figure 20:
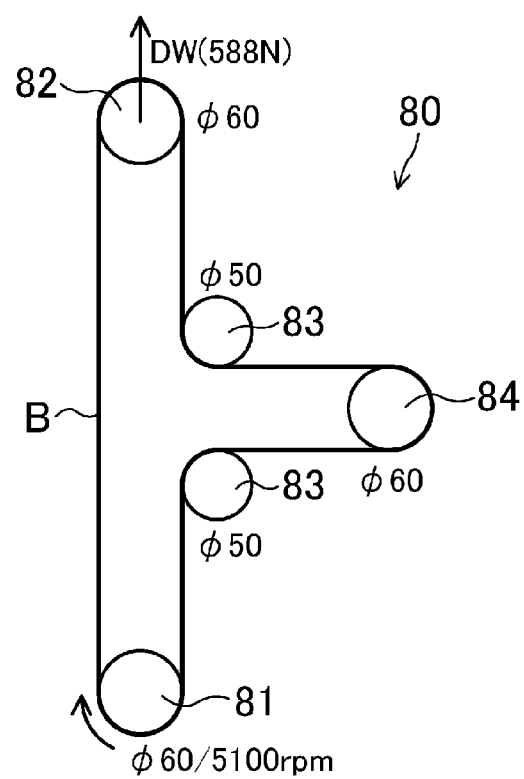
FIG. 20 is a view illustrating the layout of pulleys in a belt running tester for testing flex resistance.

FIG. 20 illustrates the layout of pulleys in a belt running tester 80 for testing flex resistance.

The belt running tester 80 includes a drive pulley 81 which is a ribbed pulley having a diameter of 60 mm, a first driven pulley 82 which is a ribbed pulley provided above the drive pulley 81 and having a diameter of 60 mm, a pair of idler pulleys 83 which are flat pulleys provided on the right side in the middle between the drive pulley 81 and the first driven pulley 82 in the vertical direction so as to be arranged in the vertical direction and having a diameter of 50 mm, and a second driven pulley 84 which is a ribbed pulley provided on the right side of the idler pulleys 83 and having a diameter of 60 mm. In the belt running tester 80, a V-ribbed belt B is wrapped such that a V-rib-side surface thereof contacts the drive pulley 81 and the first and second driven pulleys 82, 84 and that a back surface thereof contacts the idler pulleys 83 which are the flat pulleys.

Each V-ribbed belt of Examples 1-7 and Comparative Examples 1-5 having three V-ribs was placed in the belt running tester 80. A deadweight of 588 N was upwardly loaded to the first driven pulley 82 such that belt tension is loaded to the V-ribbed belt. Under an atmospheric temperature of 20° C., the drive pulley 81 rotated at a rotational speed of 5100 rpm to run the V-ribbed belt B. Then, a running time until a crack(s) are generated in the compression rubber layer of the V-ribbed belt B was measured. Note that the test was terminated when a testing time reached 150 hours.

(Test Evaluation Results)

Test evaluation results are shown in Table 3.

TABLE 3

|  | EXAMPLES | | | | | | | COMPARATIVE EXAMPLES | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| NOISE EVALUATION UNDER THE PRESENCE OF WATER | A | A | A | A | A | A | A | B | C | C | B | B |
| TRANSMISSION CAPACITY (PS) | 4.5 | 4.3 | 4.2 | 4.4 | 2.9 | 2.8 | 4.5 | 4.5 | 4.5 | 5.1 | 4.2 | 4.4 |
| HEAT RESISTANCE AND DURABILITY (hrs) | 440 | 430 | 420 | 425 | 432 | 120 | 85 | 430 | 435 | 450 | 432 | 431 |
| FLEX RESISTANCE (hrs) | >1500 | >1500 | >1500 | >1500 | >1500 | 860 | 485 | >1500 | >1500 | >1500 | >1500 | >1500 |

The results for noise evaluation under the presence of water show "A" in each of Examples 1-7, "B" in Comparative Example 1, "C" in Comparative Example 2, "C" in Comparative Example 3, "B" in Comparative Example 4, and "B" in Comparative Example 5.

The results for transmission capacity show 4.5 PS in Example 1, 4.3 PS in Example 2, 4.2 PS in Example 3, 4.4 PS in Example 4, 2.9 PS in Example 5, 2.8 PS in Example 6, and 4.5 PS in Example 7. Moreover, the results for transmission capacity show 4.5 PS in Comparative Example 1, 4.5 PS in Comparative Example 2, 5.1 PS in Comparative Example 3, 4.2 PS in Comparative Example 4, and 4.4 PS in Comparative Example 5.

The belt running time in the heat resistance and durability test was 440 hours in Example 1, 430 hours in Example 2, 420 hours in Example 3, 425 hours in Example 4, 432 hours in Example 5, 120 hours in Example 6, and 85 hours in Example 7. Moreover, the belt running time in the heat resistance and durability test was 430 hours in Comparative Example 1, 435 hours in Comparative Example 2, 450 hours in Comparative Example 3, 432 hours in Comparative Example 4, and 431 hours in Comparative Example 5.

The belt running time in the flex resistance test was more than 1500 hours in each of Example 1-5, 860 hours in Example 6, and 485 hours in Example 7. Moreover, the belt running time in the flex resistance test was more than 1500 hours in each of Comparative Examples 1-5.

The present disclosure is useful for a friction transmission belt.

The embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A friction transmission belt comprising:
    short fibers arranged so as to protrude from a surface of a pulley contact-side part made of a rubber composition,
    wherein the short fibers comprise aramid short fibers and polyester short fibers, at least some of the aramid short fibers and polyester short fibers comprise protruding parts that protrude from the surface of the pulley contact-side part, and
    a length of the protruding parts of the aramid short fibers is longer than the protruding parts of the polyester short fibers.

2. The friction transmission belt of claim 1, wherein an area occupancy of the short fibers at the surface of the pulley contact-side part is 40 to 99%.

3. The friction transmission belt of claim 1, wherein an area occupancy of the aramid short fibers at the surface of the pulley contact-side part is 30 to 80%.

4. The friction transmission belt of claim 1, wherein an area occupancy of the polyester short fibers at the surface of the pulley contact-side part is 15 to 65%.

5. The friction transmission belt of claim 1, wherein a ratio of the area occupancy of the aramid short fibers at the surface of the pulley contact-side part to the area occupancy of the polyester short fibers at the surface of the pulley contact-side part is 0.1 to 10.

6. The friction transmission belt of claim 1, wherein the aramid short fibers include para-aramid short fibers and meta-aramid short fibers.

7. The friction transmission belt of claim 1, wherein the rubber composition forming the pulley contact-side part contains the short fibers.

8. The friction transmission belt of claim 7, wherein a mixing amount of the short fibers with respect to 100 parts by mass of a rubber component of the rubber composition forming the pulley contact-side part is 10 to 85 parts by mass.

9. The friction transmission belt of claim 7, wherein a mixing amount of the aramid short fibers with respect to 100 parts by mass of the rubber component of the rubber composition forming the pulley contact-side part is 2 to 25 parts by mass.

10. The friction transmission belt of claim 7, wherein a mixing amount of the polyester short fibers with respect to 100 parts by mass of the rubber component of the rubber composition forming the pulley contact-side part is 5 to 60 parts by mass.

11. The friction transmission belt of claim 7, wherein the mixing amount of the aramid short fibers with respect to 100 parts by mass of the rubber component of the rubber composition forming the pulley contact-side part is less than the mixing amount of the polyester short fibers with respect to 100 parts by mass of the rubber component of the rubber composition forming the pulley contact-side part.

12. The friction transmission belt of claim 1, wherein the rubber composition forming the pulley contact-side part contains a filler.

13. The friction transmission belt of claim 12, wherein a mixing amount of the filler with respect to 100 parts by mass of the rubber component of the rubber composition forming the pulley contact-side part is 10 to 70 parts by mass.

14. The friction transmission belt of claim 12, wherein the filler is sheet silicate.

15. The friction transmission belt of claim 1, wherein the length of the protruding parts of the aramid short fiber is 0.05 to 5 mm.

16. The friction transmission belt of claim 1, wherein the length of the protruding parts of the polyester short fibers is preferably 0.01 to 2 mm.

17. The friction transmission belt of claim 1, wherein a length ratio of the protruding parts of the aramid short fibers to the protruding parts of the polyester short fibers is 1 to 10.

18. The friction transmission belt of claim 1, wherein the aramid short fibers are formed so as to have a length longer than a length of the polyester short fibers.

* * * * *